(12) United States Patent
Cheong et al.

(10) Patent No.: US 7,702,162 B2
(45) Date of Patent: Apr. 20, 2010

(54) MIXED CODE, AND METHOD AND APPARATUS FOR GENERATING THE SAME

(75) Inventors: Cheol Ho Cheong, Seoul (KR); Tack Don Han, Seoul (KR); Jong Young Kim, Seoul (KR); Eui Jae Kim, Seongnam (KR); Seong Hun Jeong, Seoul (KR); Jae Yun Kim, Seoul (KR); Han Yeong Choi, Seoul (KR)

(73) Assignee: Colorzip Media, Inc., Seoul (KR)

( * ) Notice: Subject to any disclaimer, the term of this patent is extended or adjusted under 35 U.S.C. 154(b) by 1136 days.

(21) Appl. No.: 11/265,562

(22) Filed: Nov. 3, 2005

(65) Prior Publication Data
US 2006/0097062 A1 May 11, 2006

(30) Foreign Application Priority Data
Nov. 5, 2004 (KR) ................ 10-2004-0089725
Mar. 26, 2005 (KR) ................ 10-2005-0025239

(51) Int. Cl.
*G06K 19/06* (2006.01)
(52) U.S. Cl. ............ 382/232; 382/100; 358/3.28; 713/176; 235/494
(58) Field of Classification Search ............ 382/100, 382/232, 245; 358/3.28; 283/113; 235/494; 713/176
See application file for complete search history.

(56) References Cited

U.S. PATENT DOCUMENTS 5,153,418 A   10/1992   Batterman et al.

| | | | |
|---|---|---|---|
| 2003/0141375 A1* | 7/2003 | Lawandy | 235/494 |
| 2003/0147549 A1* | 8/2003 | Choi et al. | 382/100 |
| 2003/0179399 A1* | 9/2003 | Matsunoshita | 358/1.13 |
| 2004/0030558 A1 | 2/2004 | Silverbrook et al. | |
| 2004/0246529 A1 | 12/2004 | Pruden et al. | |

FOREIGN PATENT DOCUMENTS

CN    1444145 A    9/2003
JP    11-328302    11/1999

(Continued)

OTHER PUBLICATIONS

Hwang et al., "Watermark in Color Image", IEEE Computer Society Proceedings on the First International Symposium on Cyber Worlds (CW'02), 2002.*

(Continued)

*Primary Examiner*—Bhavesh M Mehta
*Assistant Examiner*—Stephen R Koziol
(74) *Attorney, Agent, or Firm*—Nixon & Vanderhye

(57) ABSTRACT

A mixed code, and a method and apparatus for encoding the same are provided. The mixed code includes a first code image region storing a first code image obtained by encoding first information using color, shading, or a combination thereof, and a second code image region storing a second code image obtained by encoding second information using color, shading, or a combination thereof. The first code image and/or the second code image includes the results of encoding interpretation information, construction information, error control information, and code direction information. The mixed code is made by adjusting the difference in color and brightness between the first and second code images to a predetermined level and combining these images.

20 Claims, 17 Drawing Sheets

FOREIGN PATENT DOCUMENTS

| | | |
|---|---|---|
| JP | 11-353436 | 12/1999 |
| JP | 2000-123130 | 4/2000 |
| JP | 2000-194807 | 7/2000 |
| JP | 2002-099882 | 4/2002 |
| WO | 98/50882 | 11/1998 |

OTHER PUBLICATIONS

Office Action dated Nov. 25, 2008 from the Chinese Patent & Trademark Office.

Supplementary European Search Report for European Patent Application No. 05820537.8 (1807796).

Office Action dated Nov. 17, 2009 for Indian National Phase Patent Application No. 697/MUMNP/2007.

Comments by K & S Partners, dated Dec. 4, 2009, to major objections in Office Action dated Nov. 17, 2009 for Indian National Phase Patent Application No. 697/MUMNP/2007

* cited by examiner

| TOTAL NUMBER OF ADDITIONAL INFORMATION ELEMENT IMAGES | TOTAL NUMBER OF SUB-BASIC INFORMATION ELEMENT IMAGES | POSITIONS OF ADDITIONAL INFORMATION ELEMENT IMAGES | TYPES OF ADDITIONAL INFORMATION ELEMENT IMAGES | ENCRYPTION METHOD | ORIENTATION OF ADDITIONAL INFORMATION ELEMENT IMAGES |
|---|---|---|---|---|---|
| 1 | 1 | 1 | 8 | 0 | 0 |

| TOTAL NUMBER OF ADDITIONAL INFORMATION ELEMENT IMAGES | TOTAL NUMBER OF SUB-BASIC INFORMATION ELEMENT IMAGES | POSITIONS OF ADDITIONAL INFORMATION ELEMENT IMAGES | TYPES OF ADDITIONAL INFORMATION ELEMENT IMAGES | ENCRYPTION METHOD | ORIENTATION OF ADDITIONAL INFORMATION ELEMENT IMAGES |
|---|---|---|---|---|---|
| 25 | 25 | 1-25 (REGION #1 TO REGION #25) | 4454444454444454444444544 | 0 | 0 |

FIG. 9

| RELATIONSHIP | | | BASIC INFORMATION | ADDITIONAL INFORMATION | MIXED CODE INFORMATION |
|---|---|---|---|---|---|
| EQUALITY (=) | | | 1111 | 1111 or "colorzip.com" | 1111 or "colorzip.com" |
| RELATIONAL | | | 1122 | "colorzip" | 11color&22zip |
| APPEND | | | 1111 | 2222 | 11112222 or 22221111, 12121212, 21212121 |
| SUBSET | | | 11112222 | 2222 | 11112222 |
| O P E R A T I O N | LOGIC & BINARY OPERATION | ^ and | 1111 | 0101 | 0101 (=1111^0101) |
| | | NOT | 1111 | NOT (ADDITIONAL INFORMATION = MIXED CODE INTERPRETATION INFORMATION) | 0000 |
| | | v or | 1111 | 0101 | 1111 (=1111v0101) |
| | | XOR | 1111 | 0101 | 1010 |
| | | NAND | 1111 | 0101 | 1010 |
| | | NOR | 1111 | 0101 | 0000 |
| | | Lshift << | 1101 | 2 | 0100 |
| | | Rshift >> | 1100 | 2 | 0011 |
| | FOUR ARITHMETIC OPERATIONS | + | 1111 | 2 | 1113 |
| | | - | 1111 | 0101 | 1010 |
| | | * | 1111 | 2 | 2222 |
| | | / | 2222 | 2 | 1111 |

FIG. 10

| UNITS OF MIXED CODE | | CONSTRUCTION AND CONTENT |
|---|---|---|
| BASIC INFORMATION REGION | | DATA REGION OF BASIC CODE INFORMATION, MADE USING FIGURE, PATTERN, COLOR, SHADING, SIGN, OR A COMBINATION THEREOF |
| ADDITIONAL INFORMATION REGION | | DATA REGION OF ADDITIONAL INFORMATION IMAGE, MADE USING FIGURE, PATTERN, COLOR, SHADING, SIGN, OR A COMBINATION THEREOF |
| MIXED CODE CONTROL REGION | MIXED CODE CONSTRUCTION INFORMATION REGION | SPECIFY CONSTRUCTION OF BASIC CODE IMAGE AND ADDITIONAL INFORMATION IMAGE, AND DECODING THEREOF<br>- TOTAL NUMBER OF ADDITIONAL INFORMATION ELEMENT IMAGES, TOTAL NUMBER OF SUB-BASIC INFORMATION IMAGES, POSITIONS OF ADDITIONAL INFORMATION ELEMENT IMAGES, TYPES OF ADDITIONAL INFORMATION ELEMENT IMAGES, ENCRYPTION METHOD, AND DIRECTIONS OF ADDITIONAL INFORMATIONELEMENT IMAGES ARRANGED |
| | MIXED CODE INTERPRETATION INFORMATION REGION | SPECIFY RELATIONSHIP BETWEEN BASIC INFORMATION AND ADDITIONAL INFORMATION, AND COMBINING AND DECODING THEM<br>- RELATIONSHIP AND ARITHMETIC OPERATION<br>- INFORMATION FORMAT<br>- INFORMATION ARRANGEMENT<br>- FURTHER CONTROL OF CODE |
| | SERVICE CONTROL REGION | SPECIFY SERVICE DRIVING APPLICATION ACCORDING TO CODE INFORMATION (INVENTORY CONTROL, PIMS, SECURITY CONFIRMATION/AUTHENTICATION, WEB SERVICE, AND MULTIMEDIA SERVICE, ETC.) |
| ERROR CONTROL REGION | ERROR CORRECTION REGION | CORRECT ERROR IN BASIC CODE INFORMATION, ADDITIONAL IMAGE INFORMATION, OR ENTIRE INFORMATION |
| | PARITY INFORMATION REGION | CHECK ERROR IN BASIC CODE INFORMATION, ADDITIONAL IMAGE INFORMATION, OR ENTIRE INFORMATION |
| CODE DIRECTION INFORMATION REGION | | ARRANGEMENT AND DIRECTION DETECTION REGION OF BASIC CODE IMAGE, ADDITIONAL INFORMATION IMAGE, AND MIXED CODE |

FIG. 12

| RELATIONSHIP | | | SIGN |
|---|---|---|---|
| EQUALITY (=) | | | REQ |
| RELATION | | | RRE |
| APPEND | | | RAP |
| SUBSET | | | RSU |
| OPERATION | LOGIC AND BINARY OPERATION | ^ (and) | RAN |
| | | v (or) | ROR |
| | | XOR | RXO |
| | | NAND | RNN |
| | | NOR | RNR |
| | | Lshift (<<) | RLS |
| | | Rshift (>>) | RRS |
| | FOUR ARITHMETIC OPERATIONS | + | RPL |
| | | − | RMI |
| | | * | RMU |
| | | / | RDI |
| | FUNCTION | NOT | RNO |
| | | FUNCTION 1 | RH1 |
| | | FUNCTION 2 | RH2 |
| | | ... | ... |
| TOTAL NUMBER OF FIELDS | | 5 | RF5 |

FIG. 18A   FIG. 18B   FIG. 18C
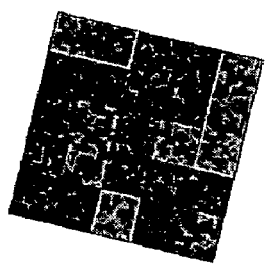 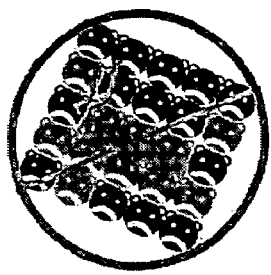 
↓ ↓ ↓
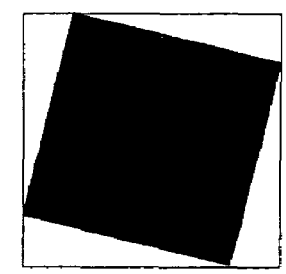 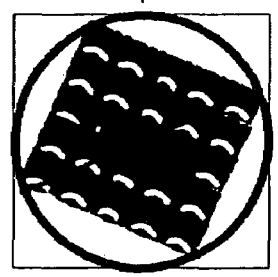 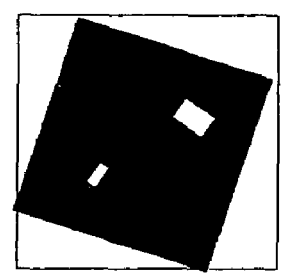
FIG. 19A   FIG. 19B   FIG. 19C
DIRECTION DETECTION REGION
ARRANGEMENT
INFORMATION REGION
LOCATION DETECTION PATTERN
ARRANGEMENT INFORMATION PATTERN
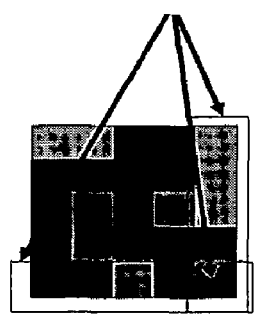 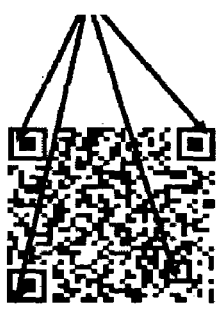 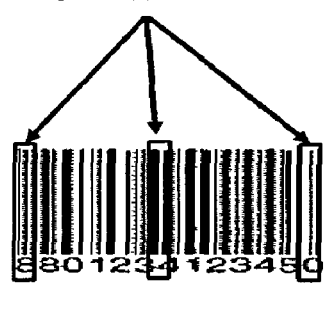

US 7,702,162 B2

MIXED CODE, AND METHOD AND APPARATUS FOR GENERATING THE SAME

CROSS-REFERENCE TO RELATED PATENT APPLICATIONS

This application claims the priorities of Korean Patent Application No. 10-2004-0089725, filed on Nov. 5, 2004, and Korean Patent Application No. 10-2005-0025239, filed on Mar. 26, 2005, in the Korean Intellectual Property Office, the disclosures of which are incorporated herein in their entirety by reference.

BACKGROUND OF THE INVENTION

1. Field of the Invention

The present invention relates to a code that is a combination of at least two code images (hereinafter referred to as a "mixed code") and a method and apparatus for generating the same.

2. Description of the Related Art

Recognizable information, such as a character, a number, and a sign, may be expressed as an image in consideration of the security of the information and a space in which the information is to be displayed. To interpret such an image (code image) containing information, a decoder is required.

The code image may be a one-dimensional barcode such as a universal product code (UPC) and a European Article Number (EAN), and a two-dimensional code such as a color code, a gray code, a Quick Response (QR) code, a PDF-417 code, and a data matrix. Information may be obtained by recognizing an image and extracting the information from the image using watermarking designed by MarkAny and a technology of recognizing a logo of an image.

Since the image code conceals information and information regarding the code is not disclosed, a user may have difficulties in using the image code. For instance, the user cannot predict whether the image code is available to a general mobile terminal or a personal digital assistant (PDA), whether the image is provided from a personal computer (PC), and whether information is contained in the image code. Also, the amount of data that can be expressed using each code is limited. Thus, in general, an image code must be newly produced whenever image data is updated, and it is difficult to include such information indicating whether the data is updated into the image code.

In general, watermarking is used to determine whether a user who desires to use an image is an authorized user or has a copyright of the image, or to provide network connection services using image information. Therefore, watermarking information is contained in an image not to be disclosed, and is not related to information regarding the image. Even if the watermarking information is related to the information regarding the image, it is impossible to decode the image using the watermarking information. Of course, a watermark can be embedded into a code image, but in this case, the watermark just combined with the original code image to make a simple combination thereof.

The color barcode is manufactured by mapping colors to a barcode pattern. Although the number of ways to express information can be increased through the color barcode, the color barcode is also a simple combination of the colors and the barcode pattern.

Alternatively, an image can be recognized by a trademark, a logo, or a pattern. In detail, an input image is recognized by preparing a database of a pattern of a specific image, and comparing the input image with a specific image from the database to determine the similarity between the images.

SUMMARY OF THE INVENTION

The present invention provides a mixed code that is a combination of first and second code images.

The present invention also provides a method and apparatus for generating a mixed code by combining first and second code images.

The present invention also provides a computer readable medium storing a computer program that executes a method of generating a mixed code by combining first and second code images.

According to an aspect of the present invention, there is provided a mixed code obtained by overlapping first information with second information in a region, the first and second information made using at least one of a character, a number, a sign, and an image, the mixed code comprising a first code image region storing a first code image obtained by encoding the first information, the first code image made using colors, shading, or a combination thereof; and a second code image region storing a second code image obtained by encoding the second information, the second code image made using colors, shading, or a combination thereof, the second code image overlapping with the first code image, the colors and shading being distinguished from the colors and shading used in the first code image, using a predetermined threshold.

According to another aspect of the present invention, there is provided a method of generating a mixed code, the method comprising encoding first information and second information into a first code image and a second code image made using colors, shading, shaping, a pattern, or a combination thereof, respectively, each of the first and second information being made using at least one of a character, a number, a sign, and an image; and producing a physical or electronic mixed code image by setting a difference in color and brightness between the first and second code images and combining the first and second code images according to the set difference.

According to yet another aspect of the present invention, there is provided a method of generating a mixed code, the method comprising encoding first information made using at least one of a character, a number, and a sign into a first code image made using colors, shading, shaping, a pattern, or a combination thereof; encoding second information into a second code image made using colors, shading, shaping, a pattern, or a combination thereof, the second information obtained by performing at least one of adding new information to the first information and deleting and changing information in the first information; changing color and brightness of the second code image such that a difference in color and brightness between the first and second code images corresponds to a predetermined threshold; and mapping the changed second code image to the first code image.

According to still another aspect of the present invention, there is provided an apparatus for generating a mixed code, the apparatus including a code image generating unit encoding first information and second information into a first code image and a second code image which are using colors, shading, shaping, a pattern, or a combination thereof, the first and second information made using at least one of a character, a number, a sign, and an image; and a code image combining unit producing a physical or electronic mixed code image by setting a difference in color and brightness between the first and second code images and combining the first and second code images based on the difference in color and brightness.

Accordingly, it is possible to easily make a mixed code that is a combination of the first and second code images.

BRIEF DESCRIPTION OF THE DRAWINGS

The above and other aspects and advantages of the present invention will become more apparent by describing in detail exemplary embodiments thereof with reference to the attached drawings in which:

FIG. 9 is a table illustrating the relationship between basic information and additional information according to an embodiment of the present invention;

FIG. 10 is a table illustrating regions of a mixed code according to an embodiment of the present invention;

FIG. 12 is a table illustrating various relationships between the basic information and the additional information according to an embodiment of the present invention, represented with signs;

FIG. 18 illustrates examples of binarization of a mixed code image and a limited rectangular search according to an embodiment of the present invention; and FIG. 19 illustrates a mixed code image with code direction and arrangement information according to embodiments of an embodiment of the present invention.

DETAILED DESCRIPTION OF THE INVENTION

Hereinafter, a mixed code, and a method and apparatus for generating the mixed code according to exemplary embodiments of the present invention will be described in detail with reference to the accompanying drawings. In addition, a method of decoding the mixed code will be described.

Figure 1:
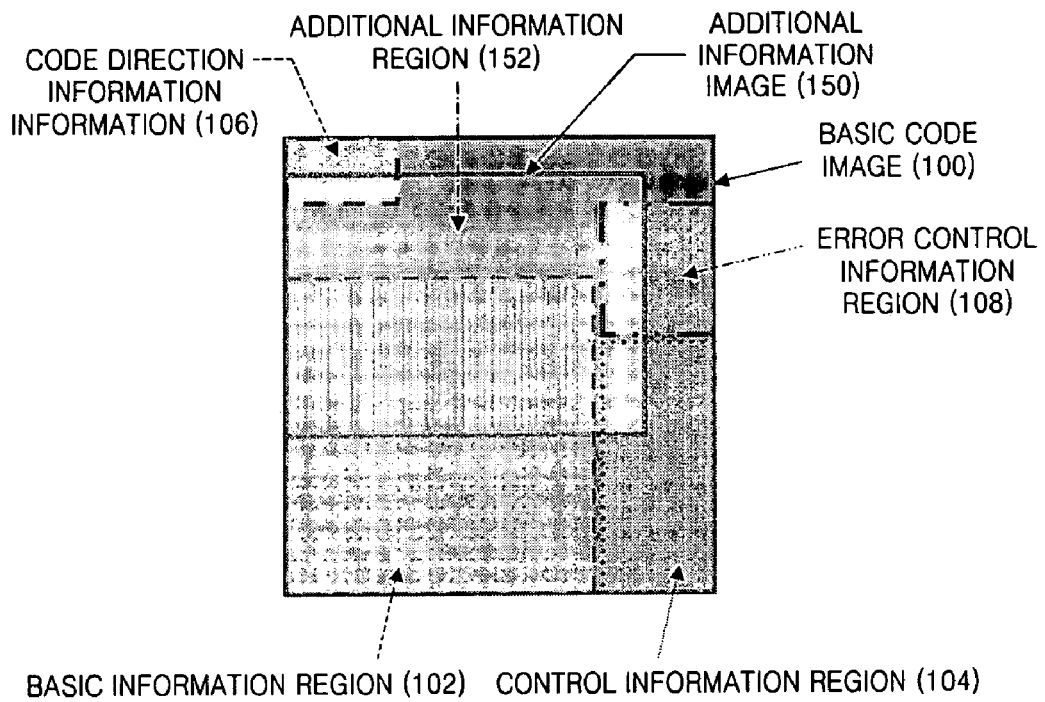
FIG. 1 illustrates a construction of a mixed code according to an embodiment of the present invention.

FIG. 1 illustrates the construction of a mixed code according to an embodiment of the present invention. Referring to FIG. 1, a code expressed with a physical image or an electronic image according to an embodiment of the present invention (hereinafter referred to as a 'mixed code') is composed of a basic code image 100 and an additional information image 150. The additional information image 150 overlaps with the basic code image 100.

The basic code image 100 includes a basic information region 102, a control information region 104 (including construction information region, a interpretation information region, and a service control region), a code direction information region 106, and an error control information region 108 (including an error verification information region and an error correction information region).

The additional information image 150 includes an additional information region 152, and may further include a control information region, a code direction information region, and an error control region in an additional information image region, if necessary.

Information stored in each of the basic information region 102, the additional information region 152, the control information region 104, the code direction information region 106, and the error correction information region 108, is encoded using colors, shading, a pattern, or a combination thereof. A one-dimensional barcode, such as a universal product code (UPC) and an EAN, and a two-dimensional barcode, such as a color code, a gray code, a QR code, a PDF-417 code, and a data matrix, may be used to encode each region of the basic code image 100 and the additional information image 150.

Figure 2:
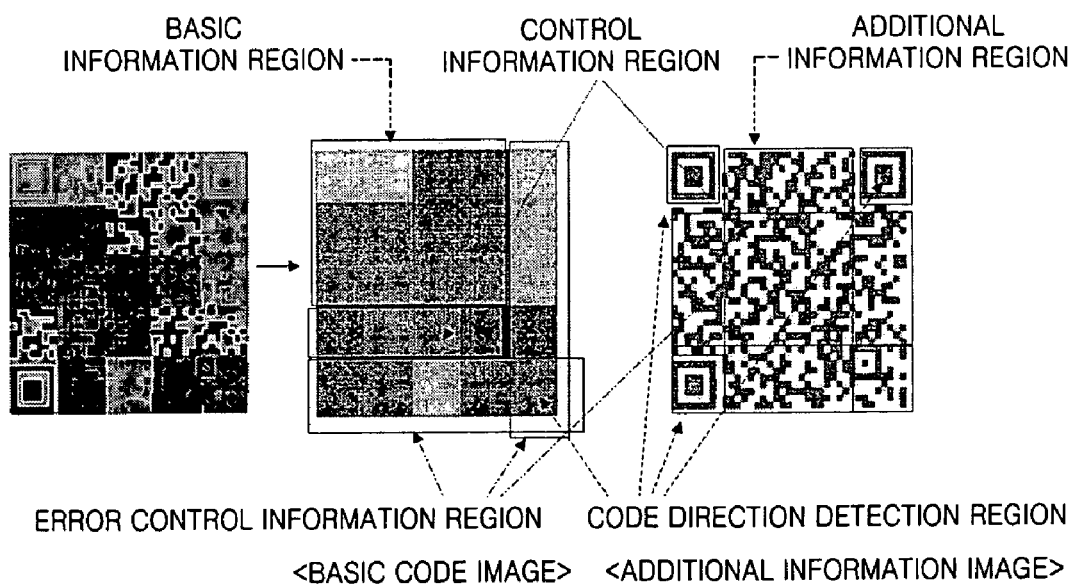
FIGS. 2, 3A, and 3B illustrate a mixed code according to embodiments of the present invention.
Figure 3A:
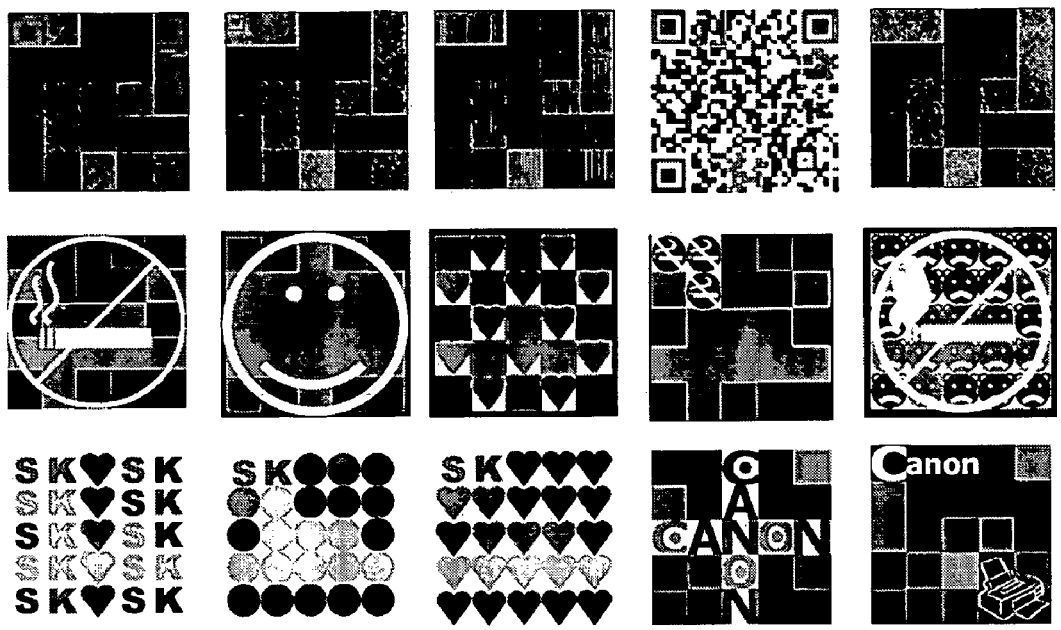
Figure 3B:
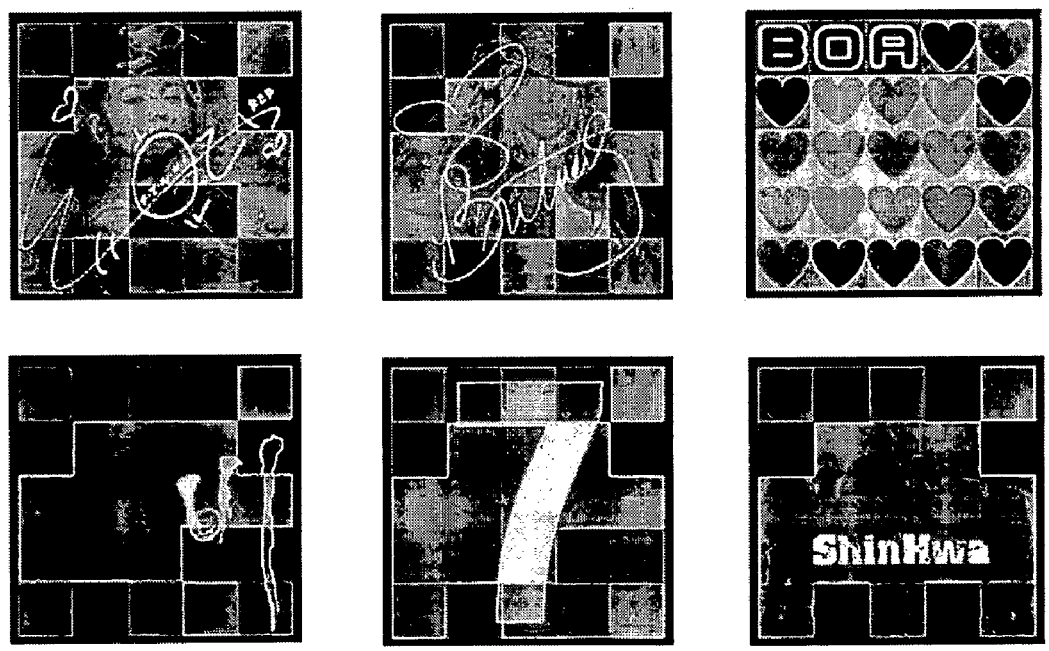

FIGS. 2, 3A, and 3B illustrate a mixed code according to embodiments of the present invention. Referring to FIG. 2, a mixed code includes a basic code image expressed with a color code and an additional information image expressed with a QR code. The basic code image includes a basic information region, a control information region, an error correction information region, and a code direction detection region. The additional information image includes an additional information region, a control information region, an error correction information region, and a code direction information region.

Each region of a mixed code will now be described in greater detail.

1. Basic Information Region

The basic information region is a predetermined part of a basic code image constituting the mixed code. This region contains basic information that is transformed into a code using colors, shading, figures, a pattern, or a combination thereof. That is, the basic information, which can be expressed with characters, numbers, signs, special characters, and images, is transformed into a code represented using colors, shading, figures, a pattern, or a combination thereof according to a predetermined code table, and then stored in the basic information region. In general, a code that is easy to recognize, e.g., a color code, is preferably used as the basic code image.

2. Additional Information Region

The additional information region is a predetermined part of an additional information image that overlaps with the basic code image in the mixed code. This region contains additional information that is represented with an image obtained using colors, shading, figures, a pattern, a mark, a sign, or a combination thereof. That is, the additional information, which can be expressed with characters, numbers, signs, special characters, images, and a logo, is transformed into a code represented using colors, shading, figures, characters, marks, symbols, or a combination thereof according to a predetermined code table, and then stored in the additional information region.

If the additional information image is a code, the additional information region is formed as a part of the additional information image. When there are a plurality of additional information images, some of sets thereof are used as the additional information region.

The additional information may include only a symbol, a signal, a trademark, and a character. For instance, when the additional information is represented with a symbol, the additional information image may further include a region (control information region, etc.) that stores information regarding the type, orientation, and arrangement of the symbol, and the symbol pattern (the similarity between the symbol pattern and another pattern).

3. Control Information Region (Construction Information Region, Interpretation Information Region, and Service Control Region)

3.1 Construction Information Region

The construction information region stores information regarding the constructions of the basic code image and the additional information image, and methods of decoding them. Thus, the method of decoding the additional image can be easily determined by decoding the construction information region. It is possible to add new construction information to or cancel the stored construction information from this region, if required.

Basically, the construction information preferably includes information regarding the types of a code in the additional information image (the color code, the QR code, the PDF-417 code, and so on), and the other information may be added to or deleted from the construction information, if required.

The construction information region is included in the control information region(s) of the basic code image and/or the additional information image. However, since a code that is easier to recognize is preferably constructed as the basic code image, the constitution information region is preferably included in the control information region of the basic code image.

Table 1 shows examples of information stored in the construction information region of the mixed code.

TABLE 1

| Number of Additional Information Element Images | Number of Sub-basic Information Images | Positions of Additional Information Element Images | Types of Additional Information Element Images | Encryption Method | Orientation of Additional Information Element Images |
| --- | --- | --- | --- | --- | --- |

As illustrated in Table 1, the construction information region stores information regarding the total number, positions, types, and orientation of additional information element images, the total number of sub-basic information images, and methods of encrypting them.

(1) Number of additional information element images: A total number of images constituting a part of the additional information image that overlaps with the basic code image (2) Number of sub-basic information images: A total number of sub-basic information images obtained by dividing the basic code image into equal parts (3) Positions of additional information element images: The positions of the additional information element images can be easily detected by allocating random numbers to the sub-basic information images based on the total number of the sub-basic information images and designating the number of a sub-basic information image in which the center of each additional information element image is located.

(4) Types of additional information element images: The type of a code in each additional information element image, the center of which is designated in information regarding the positions of the additional information element images in the sub-basic information images.

Table 2 shows information regarding various types of a code in each additional information element image on each sub-basic information image.

TABLE 2

| Image Type | 5x5 Color Code | QR | PDF 417 | Character | Sign | Trademark | Photo | Symbol |
| --- | --- | --- | --- | --- | --- | --- | --- | --- |
| Information Value | 1 | 2 | 3 | 4 | 5 | 6 | 7 | 8 |

Referring to Table 2, different information values are allocated to various types of codes of the additional information element images, e.g., a 5×5 color code, the QR code, the PDF417 code, a character, a sign, a trademark, a photograph, and a symbol.

(5) Encryption Method: An encryption method used to encrypt each additional information element image. Information regarding the encryption method may further specify an error correction level or a technique available. For instance, the encryption method may be defined as shown in Table 3.

TABLE 3

| Value | Encryption Method |
| --- | --- |
| 0 | None |
| 1 | Watermark |
| 2 | Turbo Code |
| 3 | Encryption Method 3 |

(6) Orientation of additional information element images: A direction in which each additional information element image is arranged in the basic code image. An additional information element image is read as specified in information regarding the orientation thereof.

0: no inclination
1: inclination of 45 degrees
2: inclination of 90 degrees
3: inclination of 135 degrees
4: inclination of 180 degrees
5: inclination of 225 degrees
6: inclination of 270 degrees
7: inclination of 315 degrees Examples of construction information will now be described in greater detail.

(1) When the construction information is indicated with '441234222200030020':

TABLE 4

| Number of Additional Information Element Images | Number of Sub-basic Information Images | Positions of Additional Information Element Images | Types of Additional Information Element Images | Encryption Method | Orientation of Additional Information Element Images |
|---|---|---|---|---|---|
| 4 | 4 | 1 2 3 4 | 2 2 2 2 | 0 0 0 3 | 0 0 2 0 |

Referring to Table 4, when the code in the basic code image is a color code made using various colors and the construction information region is recognized from the color code, the basic code image includes four additional information images that overlap with one another (see the total number of additional information element images), the basic information image is divided into four equal parts (see the total number of sub-basic information images), and the four additional information images are added to the centers of the equal four parts, respectively (see the positions of additional information element images). Also, the four additional information images are QR code images according to the types of the additional information element images, and a third additional information element image is rotated by 90 degrees but the other additional information element images are maintained at their original positions (see the arrangement of the additional information element images). Also, the encryption method illustrated in Table 4 reveals that three QR codes are not encrypted but a fourth additional information element image is encrypted using "encryption method 3".

Figure 4:
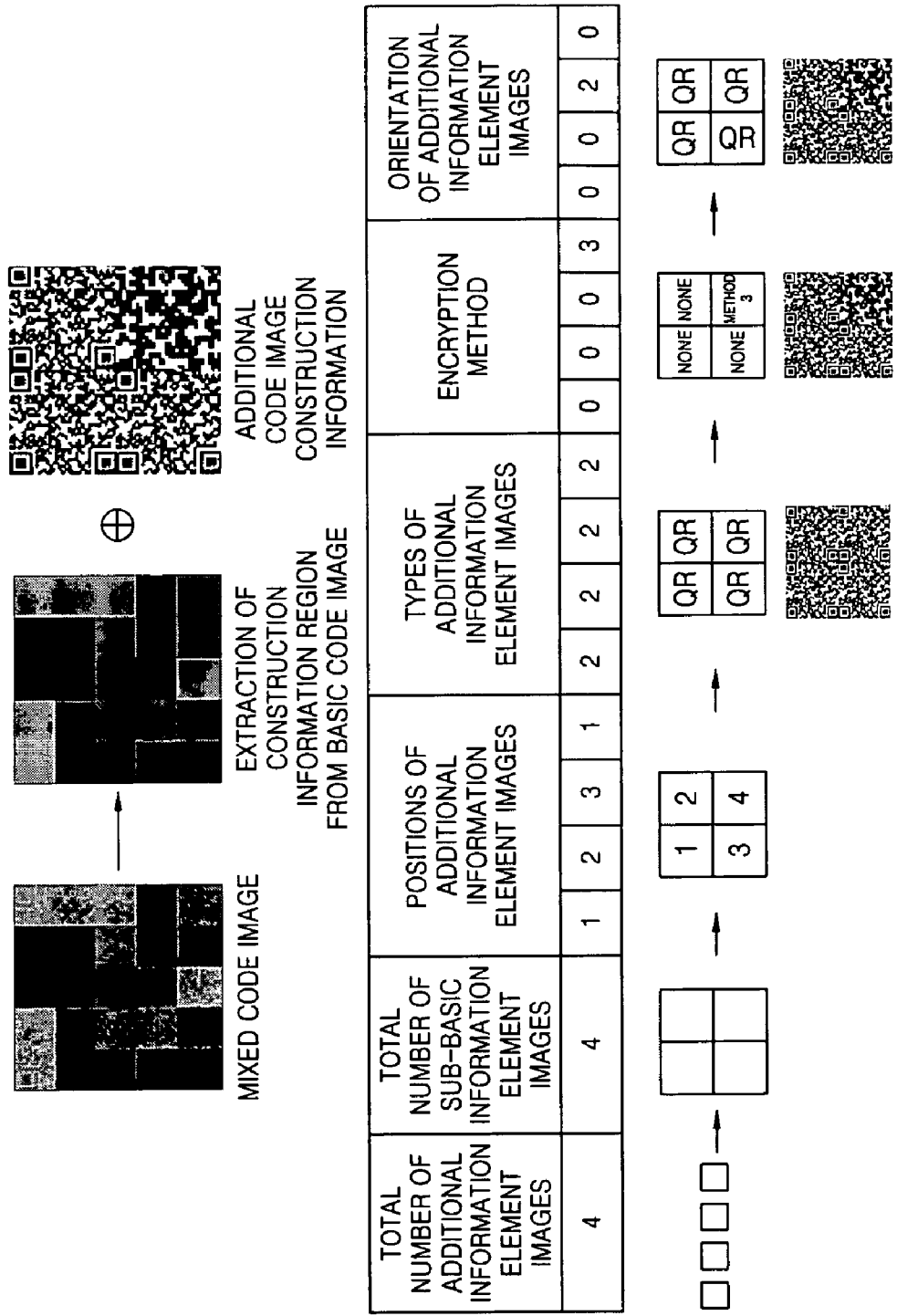
FIG. 4 illustrates a process of recognizing construction information of a mixed code according to an embodiment of the present invention.

FIG. 4 illustrates a mixed code, and a process of recognizing construction information regarding the mixed code shown in Table 4.

(2) When the construction information is represented as '111100' (see Table 5)

TABLE 5

| Number of Additional Information Element Images | Number of Sub-basic Information Images | Positions of Additional Information Element Images | Types of Additional Information Element Images | Encryption Method | Orientation of Additional Information Element Images |
|---|---|---|---|---|---|
| 1 | 1 | 1 | 1 | 0 | 0 |

Referring to Table 5, when the code in the basic code image is the QR code, a total number of additional information images is one, and the additional information image is a 5×5 color code that is not encrypted and rotated. Also, according to the total number of sub-basic information images and the positions of the additional information element images, the color code is almost equivalent to the QR code in size and the central point of the color code is identical to that of the QR code. If the color code is ⅑ times smaller than the QR code and the central point of the color code is identical to that of the QR code, the number of the sub-basic information images is changed to 9 and the positions of the additional information element images is changed to 5. That is, the color code is located at the center of the QR code that is 9 times larger than the color code.

Figure 5:
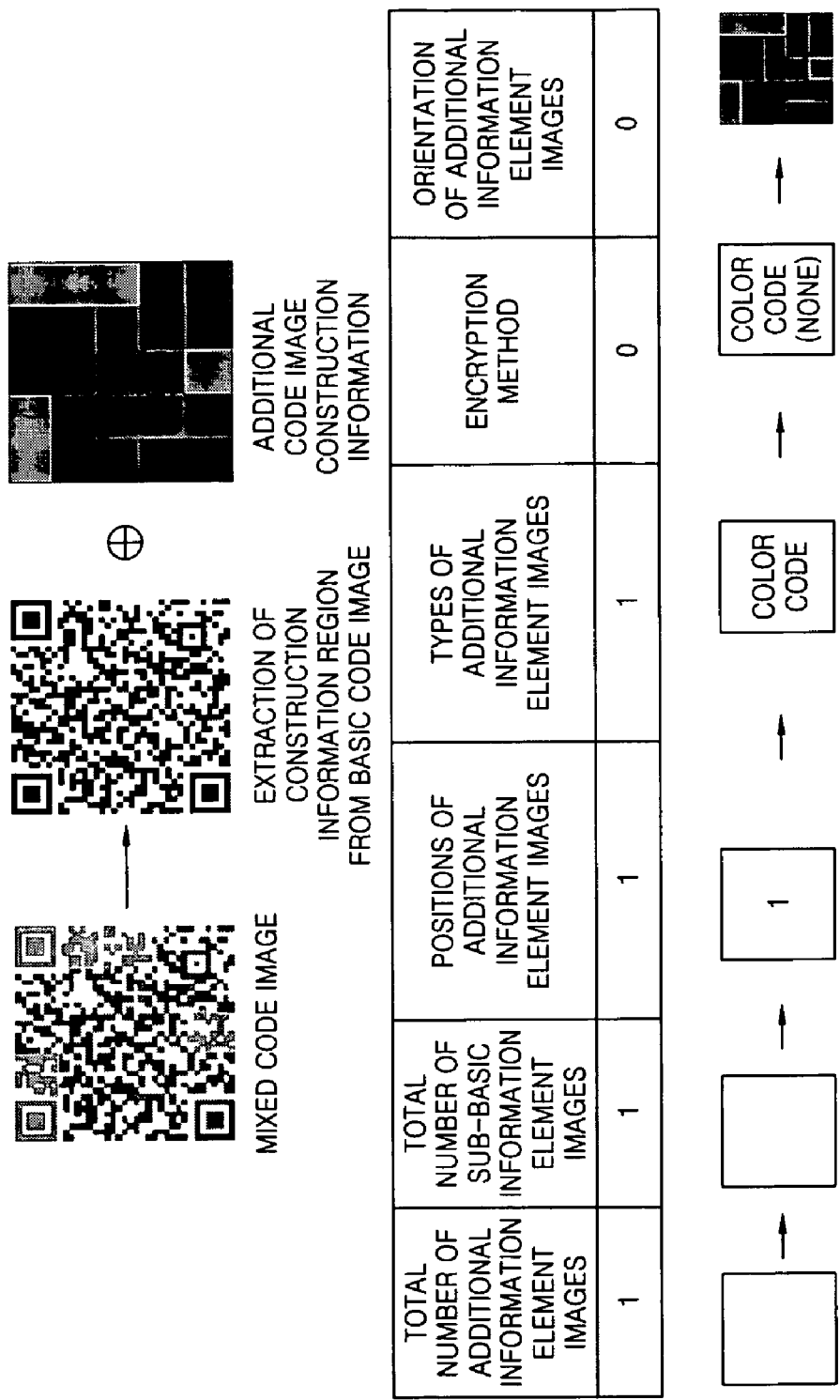
FIG. 5 illustrates a process of recognizing construction information of a mixed code according to another embodiment of the present invention.
Figure 6:
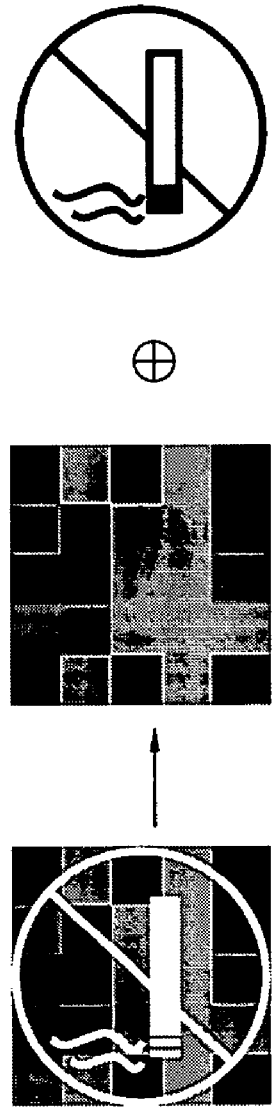
FIGS. 6 through 8 illustrate construction information of a mixed code according to embodiments of the present invention.
Figure 7:
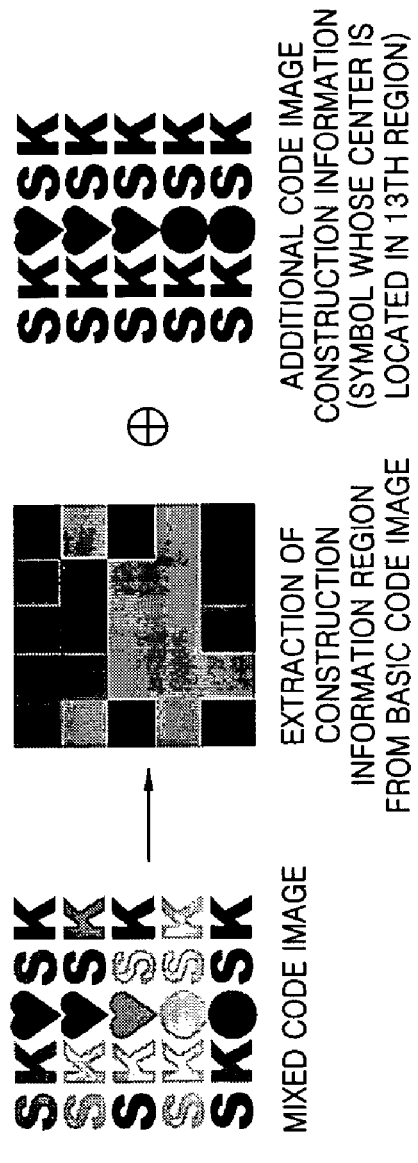
Figure 8:
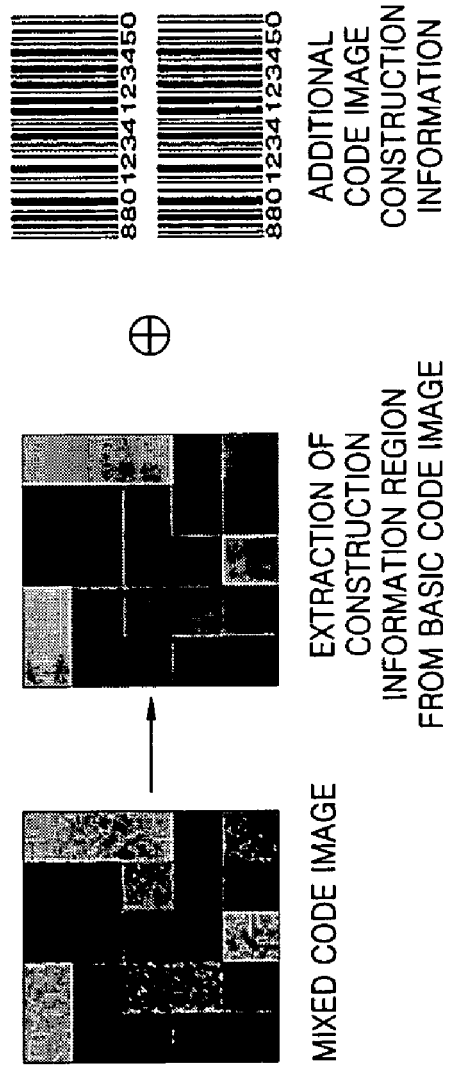

FIG. 5 illustrates a mixed code, and a process of recognizing construction information regarding the mixed code shown in Table 5. FIGS. 6 through 8 illustrate other embodiments of construction information regarding a mixed code according to the present invention.

As described above, the construction information region is preferably included in the basic code image so that the entire mixed code image can be easily decoded.

3.2 Interpretation Information Region (Relationship, Information Format, and Arrangement of Information)

The interpretation information region stores interpretation information useful to interpret the mixed code. The interpretation information specifies the relationship between the basic information and the additional information, a manner in which the basic information and the additional information are combined, and a manner in which the basic information and the additional information are decoded. The interpretation information region is located in the basic code image and/or the additional information image. In detail, the interpretation information defines the relationship between the basic information and the additional information, the formats of the basic information and the additional information, a manner in which the basic information and the additional information are arranged, and further control of code.

3.2.1 Relationship (see FIG. 9)

FIG. 9 is a table illustrating the relationship between the basic information and the additional information. Referring to FIG. 9, the relationship between the basic information and the additional information may be defined as an equal relation, a linking relation, an additional relation, a subset relation, and an arithmetic relation.

(1) Equal Relation: Basic Information=Additional Information

The basic information may be identical to the additional information. In this case, the format of the basic information may not be identical to that of the additional information. For instance, it is assumed that the code of the basic code image is a color code and the code of the additional information image is a QR code. When the result of decoding the basic information region is "1111", an additional information region of a QR code image (additional information image) may also be decoded as "1111".

(2) Combination: Basic Information+Additional Information

Information regarding the mixed code is made by combining the basic information and the additional information.

If the mixed code has information representation of "11112222", "1111" and "2222" may be encoded as the basic information and the additional information, respectively. It is possible to express various types of information by making a mixed code by adding various types of additional information images to the basic code image.

(3) Subset Relation: Basic Information ⊂ Additional Information or Basic Information ⊃ Additional Information Information regarding the mixed code may be equivalent to one of the basic information and the additional information. For instance, when ten goods are put in a box, a mixed code of the box is obtained by encoding information represented as 1000 through 1010, and the goods have code images corresponding to 1000 through 1010, respectively. Thus, the mixed code for the box is decoded to obtain information regarding the goods in the box.

(4) Binary Operation: The interpretation information specifies a binary operation to be performed on basic information and additional information regarding the mixed code.

(5) Four Arithmetic Operations: The interpretation specifies four arithmetic operations to be performed on the basic information and the additional information of the mixed code.

3.2.2 Information Format

The interpretation information defines the formats of the basic information and the additional information. The same code may be decoded in different formats, using characters, numbers, signs, or images. For instance, the same code can be decoded into "color", "636F6C6F72", i.e., hexadecimal digits, or "099111108111114", i.e., binary digits. Accordingly, the mixed code can be decoded variously depending on the format of the basic information, the additional information or a combination thereof.

3.2.3 Information Arrangement

The positions of pixels of basic information image and the additional information image may be changed, if required. For instance, it is possible to change an absolute or relative position of each pixel of a QR code disposed on a color code using a predetermined transformation method. In this case, arrangement of information defined in the interpretation information region is decoded and the code of the additional information image is decoded according to the result of decoding.

In general, changing the position of each pixel of an image is applicable to a service that requires an additional information image to be encrypted. For instance, it is possible to determine whether a person's picture is identical to a passport photograph by transforming the passport photograph into an additional information image, including the additional information image into a mixed code, and decoding it using a region storing information regarding arrangement of information. When using an additional information image that is a code for an authentication service, for example, the additional information image can be protected by changing the positions of pixels thereof. In this case, it is preferable that encryption and decryption algorithms are embedded into a program and the additional information image is processed after reading the information regarding the arrangement of information from the mixed code. In particular, a degree of encrypting the additional information image can be increased by further using an algorithm using a key value and a method thereof.

The information regarding the arrangement of information appears to be similar to the location information and the orientation information of the additional information image which are included in the construction information of the mixed code. However, the information regarding the arrangement of information is different from them in that it is obtained in pixel units or units that are less than the element-image units, not in the unit of the additional information image.

3.2.4 Further Control of Code

An additional information image may later be overlapped with or added to the basic code image. For instance, when only a color code image has been used, a barcode may be added to overlap with the color code to provide further, various services. Information regarding the added images is stored in the additional information image.

(1) Addition: Additional information is added to information stored in a basic code. For instance, an additional information image is further printed on a document printed with a basic code image for document management. Also, information regarding the address of a video presentation file may be added to the original document. In this case, a control information region is added to the additional information image with an additional information region.

(2) Deletion: An additional information image, e.g., regarding the term of validity of the basic code image, may further be printed on a basic code image, thereby erasing information linked to the basic code image or preventing the information from being used.

(3) Modification: The original code information is changed by appointing a portion thereof to be changed when changing of a telephone item of a business card, for example.

3.3 Service Control Region

In the service control region, services that additionally use the mixed code are appointed so as to run an application program according to a way in which each service is provided or controlled and to provide various services using the relationship between the basic information and the additional information.

For instance, when the basic code image is used to represent the identification (ID) of a user and the additional information image is a photograph image of the user, they can be used in various services, such as a business card information service, a passport authenticating service, a simple photo information service, and an individual web site service, according to information to be defined in the service control region.

The information in the service control region is closely related to the interpretation information region of the mixed code. However, specifically, the interpretation information concerns an operation to be performed to constitute and interpret information regarding the mixed code, whereas the information in the service control region concerns operating of an application. For instance, the information in the service control region is used in operating a specific application, designating a user interface, or determining the address of a database server.

4. Error Control Region

The error control region stores information required to determine whether an error occurs in decoding the mixed code, and correct the error. The error control region is preferably included in both the basic code image and the additional information image in order to detect an error in each image. Such a process is preferably performed on the entire mixed code. However, the inclusion of the error control region into the additional information image is optional, particularly, when the additional information image is a symbol, a mark, or a photograph image.

Various, general methods such as a parity technique or a check bit operation may be used to determine whether an error occurs in decoding the mixed code, and a typical error correction technique such as a Reed-Solomon code may be applied to correcting the error.

5. Code Direction Information Region (Direction Detection and Arrangement Region)

The code direction information region (direction detection and arrangement region) is included into one of or both the basic code image and the additional information image. Inclusion of the code direction information region is preferable, since it provides a reference pint of an image and basic information required to determine a sequence in which the basic code image or the additional information image is decoded.

The code direction information region is constructed using a general technique using a specific pattern, sign, symbol, or parity operation, so that this region can be easily detected.

For instance, the code direction information region may be constructed using: starting, ending, and interim descriptors of a barcode or a PDF-417 code; a pattern for detecting the location of a QR code or a data matrix code; a method of determining a sequence in which color cells are arranged; a method of determining whether a mark/character is located at its original position (a pattern matching method); or a method of determining intersecting cells of multiple parity cells (a method of determining a position at which a particular column intersects with a particular row, using a parity procedure different from a parity procedure applied to columns and rows).

In general, the code direction information region is preferably included in the basic code image so that this region can be easily detected. Inclusion of a code direction information region into the additional information image is optional. However, the inclusion of the code direction information region enables various uses of the additional information image.

In other words, it is possible to increase the amount of information to be expressed or diversify the use of the mixed code by arranging the basic code image and the additional information image in different directions. Thus, the mixed code is highly likely to be made by changing the original direction in which one of the basic code image and the additional information image is arranged. As noted from the construction information of the mixed code, even when one of the additional information image and the basic code image does not include the code detection information region, the direction information of one element image of the mixed code may be included in the other images of the mixed code. However, both the basic code image and the additional information image preferably include the code direction information region to guarantee image recognition. The above regions of the mixed code are specified in a table illustrated in FIG. 10.

Figure 11:
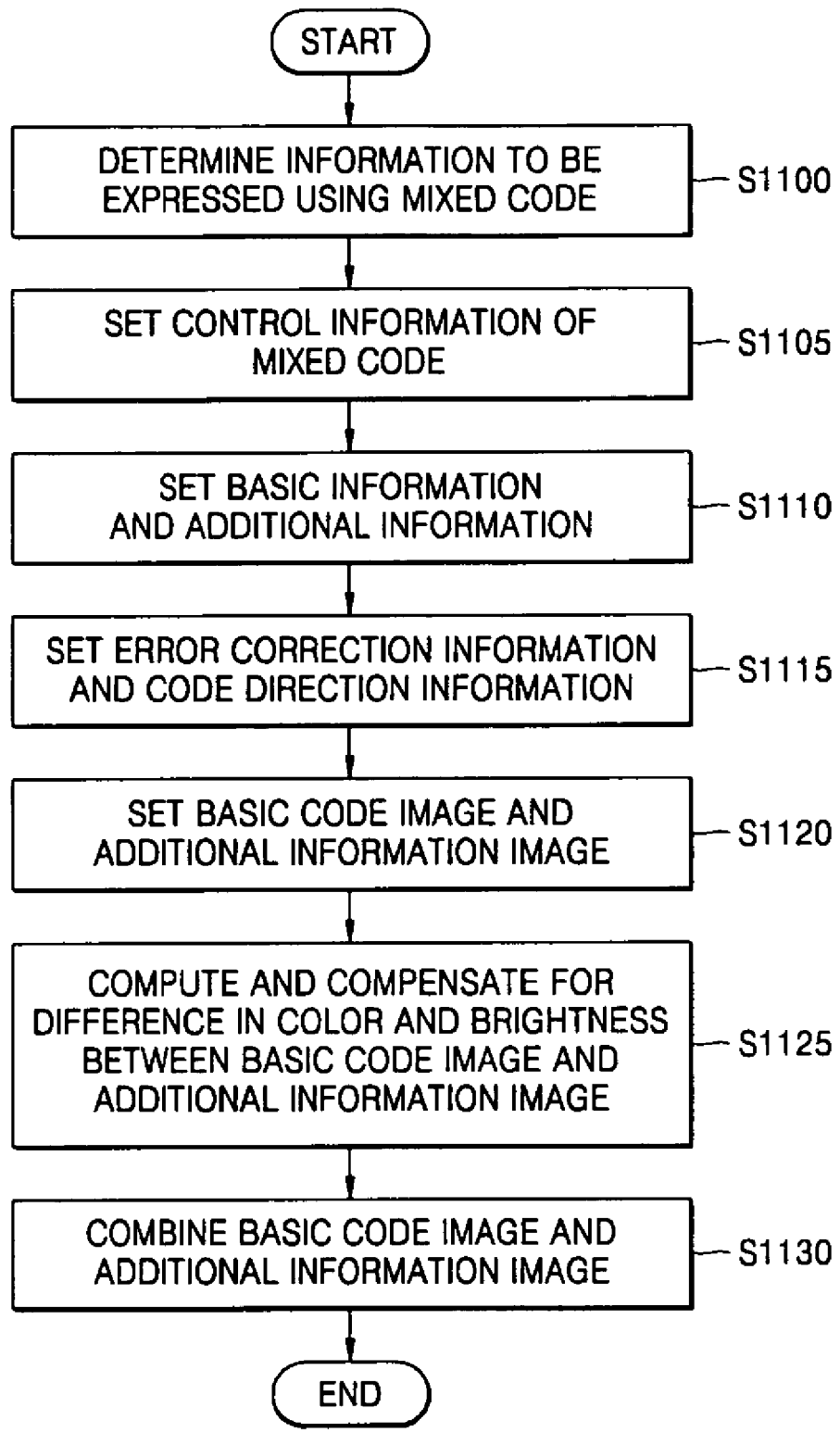
FIG. 11 is a flowchart illustrating a method of generating a mixed code according to an embodiment of the present invention.

FIG. 11 is a flowchart illustrating a method of generating a mixed code according to an embodiment of the present invention. Referring to FIG. 11, first, information to be expressed using a mixed code is determined (S1100). Next, control information, such as construction information and interpretation information, of the mixed code is defined (S1105), and basic information and additional information regarding the mixed code are determined based on the defined control information (S1110). Next, error correction information that is used to detect and correct an error, and location information regarding codes of the mixed code are determined (S1115).

Next, a basic code image and an additional information image are determined based on the determined information (S1120). Then, an operation is performed on the basic code image and the additional information image to measure the difference in color and brightness therebetween, and the difference is compensated for (S1125). Thereafter, the mixed code is made by combining the basic code image and the additional information image based on the compensated color and brightness (S1130).

In other words, in the method of FIG. 11, first information and second information, each being made of at least one of a character, a number, a sign, and an image, are encoded into a first code image and a second code image, which are made using colors, shading, shaping, a pattern, or a combination thereof, respectively (S1100 through S1120).

Next, the difference in color and brightness between the first and second code images is set, and a mixed code image, which is a physical or electronic image, is obtained by combining the first and second code images based on the set color and brightness differences (S1125 and S1130).

Each operation of the method of FIG. 11 will now be described in greater detail.

1. Determination of the Information Regarding the Mixed Code (S1100)

Information to be expressed using the mixed code is determined. The information may be represented with a character, a number, a sign, and/or an image (pattern, logo, photograph, etc.), or may be content. Also, the information may be transformed into content-related information through a predetermined method.

2. Determination of the Control Information Regarding the Mixed Code (S1105)

The information to be expressed using the mixed code is divided into the basic information and the additional information. Thus, the amounts and types of the basic information and the additional information may vary depending on the relationship between the basic information and the additional information. Further, the control information is required to make the basic information and the additional information such that their constructions can be easily recognized.

For instance, the code types of the basic code image and the additional information image, the total number of element images of the additional information image, and arrangement of the additional information image vary depending on the amounts of the basic information and the additional information.

The control information of the mixed code is divided into the interpretation information and the construction information. The interpretation information is preferably determined after determination of the construction information, since the amount and construction of the information regarding the mixed code depend on the definition of the interpretation information. Thus, after determining the control information (interpretation information and construction information), the contents and constructions of the basic information and the additional information are defined.

In general, when being encoded in the control information region of the mixed code, the control information is preferably encoded in a predetermined information format, that is, using a format of numbers and characters. In this case, the basic code image and the additional information image can easily be decoded by decoding the control information region of the mixed code prior to interpreting the mixed code and decoding the basic code image and the additional information image based on the result of decoding.

2.1 Determination of Interpretation Information Regarding Mixed Code

In this operation, the interpretation information required to interpret the mixed code is set. Specifically, the interpretation information defines the relationship between the basic information and the additional information; a combination of the basic information and the additional information by performing an operation thereon, the formats of the basic information and the additional information, and arrangement of the basic information or the additional information. The interpretation information mixed code is preferably included in the control information region of the mixed code (interpretation information region). However, when the interpretation information is included in a decoding program, whether the interpretation information is to be included in the mixed code depends on the relationship between the basic information and the additional information.

For instance, when a mixed code includes a color code and a 21×21 cell size QR code that are encoded into the basic code image and the additional information image, respectively, the interpretation information may be determined in a program to specify that the basic information is identical to the additional information, that they are made using numbers and characters, and an encryption method. In this case, the control information region (interpretation information region) is not included in the mixed code.

2.1.1 Determination of Relationship

When the information regarding the mixed code is divided into the basic information and the additional information, the relationship between the basic information and the additional information must be set. For instance, if the basic information and the additional information are identical to each other, both of them are encoded using the same information, and if they are combined to form the mixed code, the mixed code is divided into the basic information and the additional information and they are separately encoded.

When each of the basic information and the additional information includes the other, one of them is encoded as the entire information regarding the mixed code and the other is encoded as a part of the information regarding the mixed code. The basic information or the additional information may be in an arithmetic relation, if required. In this case, the information regarding the mixed code can be derived by performing an operation on one of the basic information and the additional information using the other information.

One of the basic information and the additional information may be used as a key value or an index of the other. In this case, when one of the basic information and the additional information is constructed as a field, data regarding a field corresponding to the other information can be obtained using a key value of the field. Also, one of the basic information and the additional information may be a key value and the other information may specify a Hash function used to calculate a specific function, particularly, a reverse function. In this case, it is possible to create new information as the information regarding the mixed code by applying the key value to the Hash function. Specifically, the key value is obtained by taking a reverse function of a value of the mixed code, and a function and a key value are computed as the basic information and the additional information. FIG. 12 is a table illustrating various relationships between the basic information and the additional information using signs, according to an embodiment of the present invention.

2.2.2 Definition of Information Format

The formats of the basic information and the additional information may be defined using the relationship between the basic information and the additional information and the information regarding the mixed code. The information regarding the mixed code may specify whether the format of each of the basic information and the additional information is a character format, a value format, a sign format, or an image format.

For instance, the same information can be decoded into "color", "636F6C6F72", i.e., hexadecimal digits, or "099111108111114", i.e., binary digits. Otherwise, the information may be expressed with a predetermined sign, symbol, or pattern construction information representation of a color paint icon. In particular, an image may be represented using a series of RGB values.

In most cases, the formats of the basic information and the additional information are different from each other, and thus, both the formats of the basic information and the additional information are preferably specified.

Table 6 illustrates various formats of information contained in the mixed code.

TABLE 6

| Type | Decimal Number | English Mode | Chinese Mode | Korean Mode | Japanese Mode | Sign | RGB | Gray | Pattern | YUV | ... |
|---|---|---|---|---|---|---|---|---|---|---|---|
| Information Value | 1 | 2 | 3 | 4 | 5 | 6 | 7 | 8 | 9 | 0 | ... |

$f_{type}$(basic information format 1+additional information format 2)=T12

For instance, when the basic information is made of numbers and the additional information is made of English characters and numbers, the information in the mixed code is preferably encoded in a T12 (Type 1 & 2) format. The English mode shown in Table 6 supports use of both English characters and numbers.

2.1.3 Definition of Arrangement of Information

When encoding basic information and the additional information, it is possible to change a sequence or arrangement in which they are located if required. As described above, when it is preferable that code information does not appear directly in an image, e.g., a photograph image, or high-degree encryption of information is required, the order of the information is changed or the information is encrypted using a predetermined transform technique. In this case, an algorithm by which the transformed information is recovered to its original state is required. Also, it is effective to set an information value (key value) that indicates a change in the sequence or arrangement of the basic information and the additional information.

2.1.4. Definition of Service Information

Information regarding an application to be executed based on the basic information or the additional information is preferably set, because the mixed code is applicable as information to various types of applications. However, when use of the mixed code is obvious or has been set by programming the information regarding an application may not be set.

2.2 Determination of Construction of Mixed Code

The formats and amounts of the basic information and the additional information are determined the control information regarding the mixed code. Thus, the types and constructions of the basic code image and the additional information image that represent the basic information and the additional information must be determined according to the control information. In this case, the amount of data, the characteristics of a medium onto which the images are to be printed, a recognition method, and a service manner must be considered.

That is, when the mixed code has a large amount of information and is used to express information, the QR code, the PDF417 code, the data matrix, or an ultra code may be used to represent as a part of an image constituting the mixed code. However, when the mixed code is not used to express information and digital content is to be imported via a network, a combination of the color code, a cyber code, and a one-dimensional (1D) barcode may be used.

If the mixed code is to be made such that information contained therein can easily be recognized by a user, an additional information image of the mixed code is preferably made of characters, a trademark, a sign, a mark, or a pattern.

If the mixed code is to be printed onto a color printing medium, a color code or a color image may be used, and if the mixed code is to be printed onto a black-and-white color printing medium, a gray code or a black-and-white image may be used.

Different recognition methods must be applied to a high-definition display apparatus such as a scanner and a low-definition display apparatus such as a mobile phone camera. When using a mobile phone camera, the color code, a two-dimensional (2D) code or barcode that requires a small number of cells, a simple pattern, or a small amount of characters, numbers, or a trademark image may be used. Use of the high-definition display apparatus enables more types of images to be used and a large amount of information to be obtained through a decoding process.

It is preferable that a user determines the construction of the mixed code by selecting desired ones of programmable combinations or pieces of element information that are determined in consideration of the amount of data, a recognition method, the characteristics of a medium, and the type of a service and provided via a user interface. Otherwise, once the user determines a minimum of characteristics of the mixed code, the construction of the mixed code may be automatically set according to a program. That is, for instance, when the types of the basic code and the additional image are determined, the most desirable total number or sizes of cells (or modes) are determined according to the program.

The construction information region of the mixed code stores the construction information regarding the basic code. In addition, as described above, the construction information region may further store information regarding a total number, locations, and types, and orientations of additional information element images, a total number of sub-basic information images, and an encryption method.

In particular, in the encryption method, the additional information element images are encrypted, using watermarking or other encoding techniques, for example. It is effective to set a code, an image of which is easy to detect and decode, as the basic code, and make the control information to decode and make use of the additional information image.

3. Determination of Basic Information and Additional Information (S1110)

The formats of the basic information and the additional information, and the relationship between the basic information and the additional information are set according to the control information. The basic information and the additional information, which are encoded to make the mixed code, are determined according to the formats of the basic information and the additional information and the control information. The basic information and the additional information may be made in a character format, a number format, a sign format, a symbol format, or a pattern format. Each of the basic information and the additional information is transformed into colors, brightness, a shade, a pattern, symbols, characters, signs, or a logo according to a predetermined transform table. The results of transforming the basic information and the additional information are included into a data region of the mixed code image (the basic information region or the additional information region).

4. Determination of Error Correction Region (S1115)

The error correction information regarding the basic information and the additional information is set. One or at least two of check bits, parity information, and error correction information may be used as the error correction information.

It is preferable that the error correction information is obtained by separately performing an operation on each of the basic information and the additional information to check an error therein, thereby reducing a time required to perform the operation. However, the error correction information may be obtained by performing the operation on the entire mixed code, if required. In particular, when the information regarding the mixed code is to include both the error correction information and the parity information (or the check bits), the parity information is preferably generated after generation of the error correction information. This is because it is possible to first detect the location of an error by using a parity operation, and make it possible to use a part of the result of the parity operation in detecting the location and orientation of a code, e.g., the color code.

The check bits are used to detect an error in the barcode, and the parity operation is obvious to those of ordinary skill in the art. The Reed-Solomon code operation is a representative error correction technique. In the case of the QR code and the PDF-417 code, each having a predetermined error correction region, the predetermined error correction region may be used. If one of two pieces of information is encoded to an image or a logo, inclusion of the error correction region is optional. In contrast, inclusion of the error correction region into the basic code is required. Also, information regarding the degree of an error correction rate may be made in a specific part of the error correction information region or in the order of cells, together with the error correction region.

5. Determination of Code Direction Information (S1115)

After determining the information regarding the mixed code, the code direction information region (direction detection and arrangement region) to be included into the mixed code image must be made. Direction detection and arrangement information stored in the code direction information region may be represented with a specific pattern or a figure, such as the barcode or the QR code, or by using a part of the parity information based on a fact that an operation to be performed on a specific cell is different from that to be performed on the other cells in a color code, for example.

The direction detection and arrangement information may be contained in both the basic code image and the additional information image, but it must be contained in the mixed code image.

6. Determination of Basic Code Image and Additional Information Image (S1120)

In operation S1120, the predetermined basic information, additional information, control information, error control information, and code direction information are divided into the basic code image and the additional information image so as to virtually set images. Each information is transformed into a color, brightness, a shade, a pattern, a sign, a symbol, a trademark, or a character according to a code transform table, and is used as a constitutional element of the basic code image or the additional information image. In operation S1120, the arrangement and sizes of the basic code image and the additional information image may be made based on the construction information of the predetermined control information, and the basic code image and the additional information image may be made based on information regarding encryption method.

7. Computing and Compensating for Difference in Color and Brightness Between Basic Code Image and Additional Information Image (S1125)

In operation 1125, to combine the set two images, the difference in color and brightness between them is determined using a predetermined algorithm and apparatus. For instance, the difference in color between them is increased for easy separation of the two images, and the difference in color and brightness between them is reduced to conceal the additional code image. In operation 1125, based on the predetermined control information, it is possible to increase or reduce the difference in color and brightness between the images in consideration of the use of a service and the encryption method.

Figure 13:
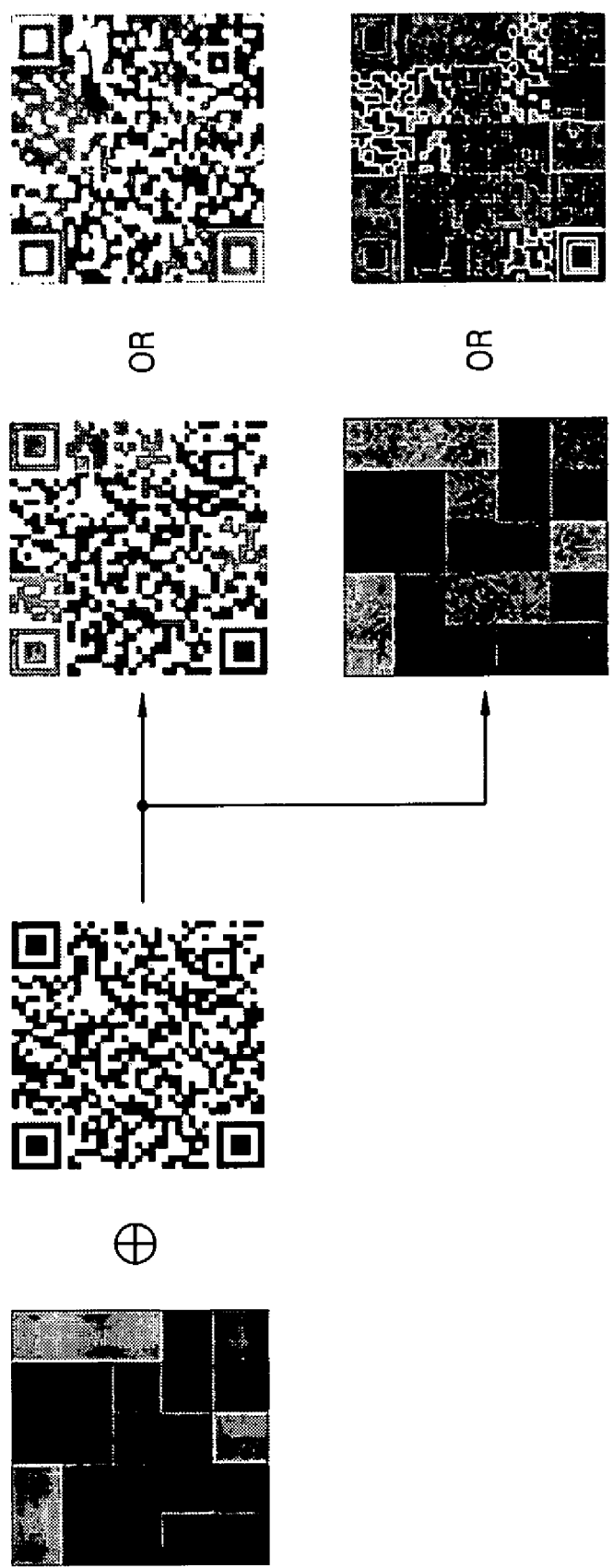
FIG. 13 illustrates examples of a mixed code composed of a color code image and a QR code image according to an embodiment of the present invention.

FIG. 13 illustrates embodiments of a mixed code that is a combination of a color code image and a QR code image according to the present invention. The color code image is made using colors and shading, and the QR code image is a black-and-white image. Thus, the color code and the QR code may be combined by coloring the QR code based on the color code, such that a white part of the QR code is brighter than a black part thereof or the black part of the QR code is colored without changing the white part (of course, the opposite is possible).

When using a pattern such as a logo or a trademark, the color and brightness of the pattern must be determined in consideration of those of an image to be used with the pattern. For instance, it is not desirable that a black pattern overlaps with the QR code, the color and brightness of which are identical to those of the black pattern or a white pattern overlaps with the QR code, which leads to damage to the image.

8. Combination of Basic Code Image and Additional Information Image (S1130)

In operation S1130, the two images, the difference in color and brightness of which is computed, are combined. In this case, the two images are combined to be exactly mapped to each other, based on the construction information of the control information. The result of combining the two images may be used as a digitalized file, displayed on a display unit, or printed onto a physical medium.

Figure 14:
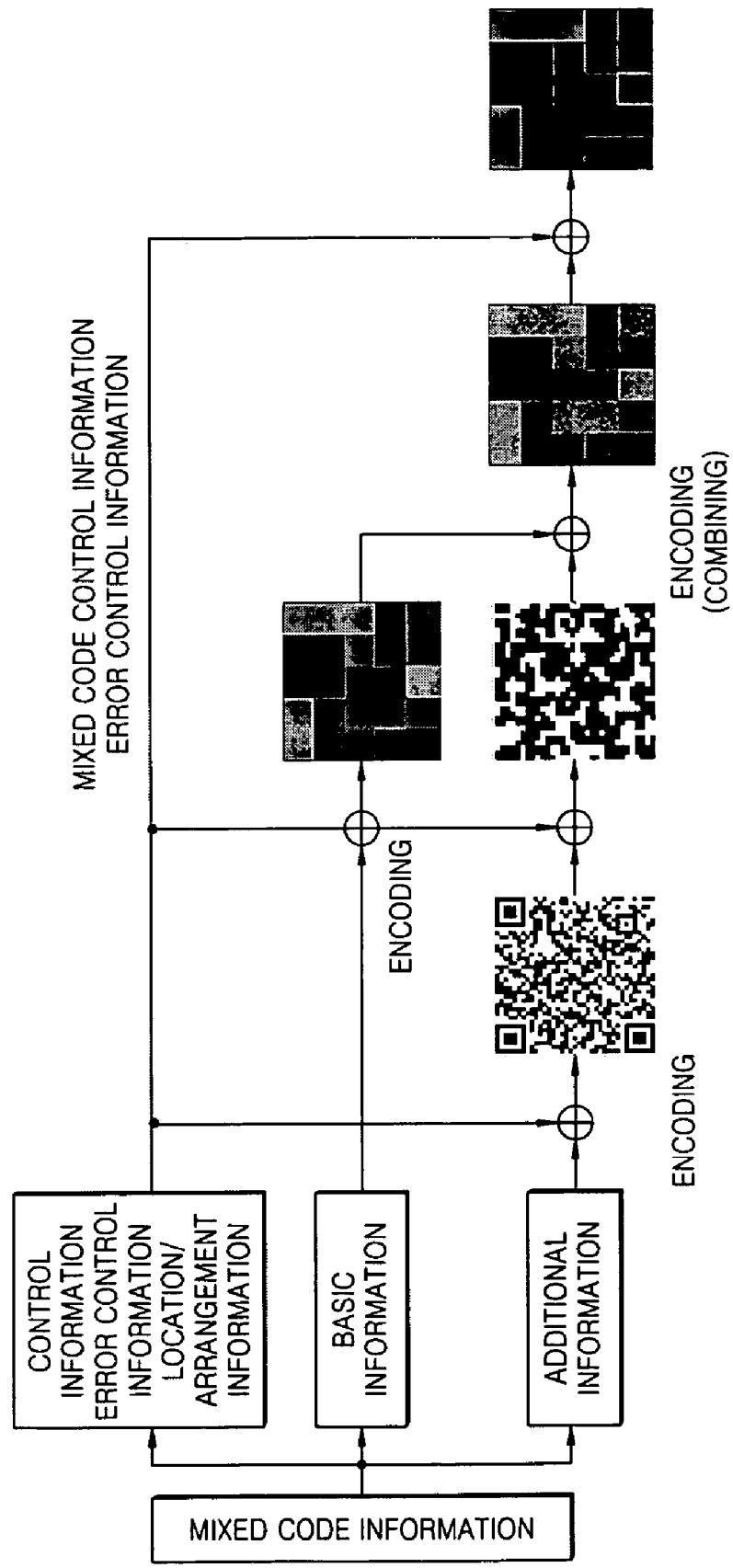
FIG. 14 illustrates a process of making a mixed code by combining a color code image and a QR code image according to an embodiment of the present invention.

FIG. 14 illustrates a process of generating a mixed code by combining a color code image and a QR code image according to an embodiment of the present invention. Referring to FIG. 14, information regarding the mixed code is divided into basic information and additional information, and control information required to transform the basic information and the additional information to a basic code image and an additional information image, respectively, is set. Next, the basic information and the control information are encoded into colors to obtain the basic code image, and the additional information and the control information are encoded into a QR code to obtain the additional information image. Then, the difference in color and brightness between the basic code image and the additional information image are determined and the basic code image and the additional information image are combined to make the mixed code.

Figure 15:
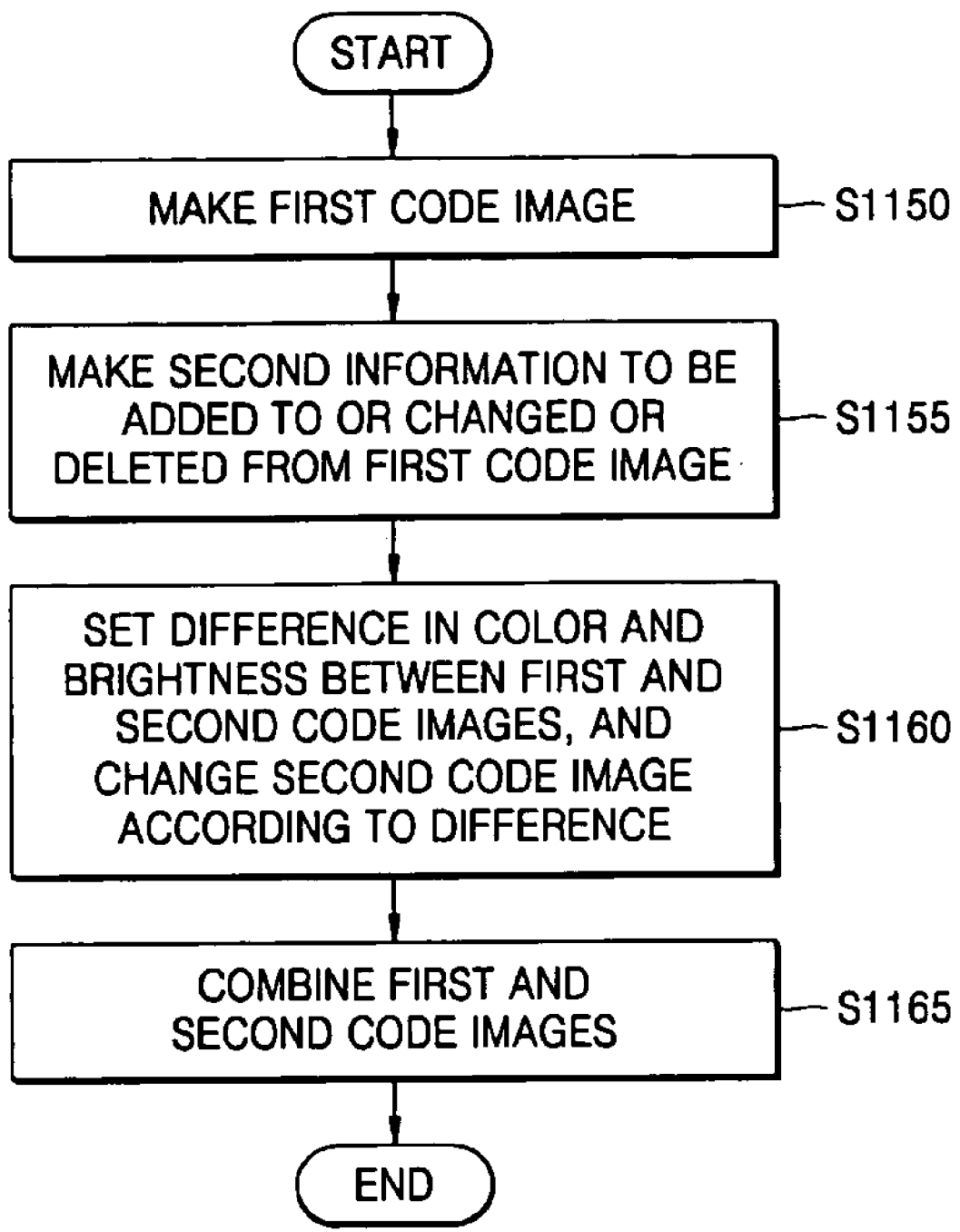
FIG. 15 is a flowchart illustrating a method of generating a mixed code according to another embodiment of the present invention.

FIG. 15 is a flowchart illustrating a method of encoding a mixed code according to another embodiment of the present invention. Referring to FIG. 15, first information comprised of at least one of a character, a number, a sign, and an image is encoded into a first code image formed using colors, shading, an image, a pattern, or a combination thereof (S1150).

Next, second information, which is made to add new information to the first code image or change or delete information from the first code image, is encoded into a second code image made using colors, shading, shaping, a pattern, or a combination thereof (S1155). Specifically, construction information specifying the relationship between the first and second information and arrangement of information in the second code image is made, the second information is encoded in a data region of the second code image, and the construction information is encoded in a control information region of the second code image.

Next, the difference in color and brightness between the first and second code images is set to a predetermined threshold or more, and the color and brightness of the second code image are compensated for based on the set difference (S1160). Next, the second code image is mapped to the first code image, thereby generating the mixed code (S1165).

Figure 16:
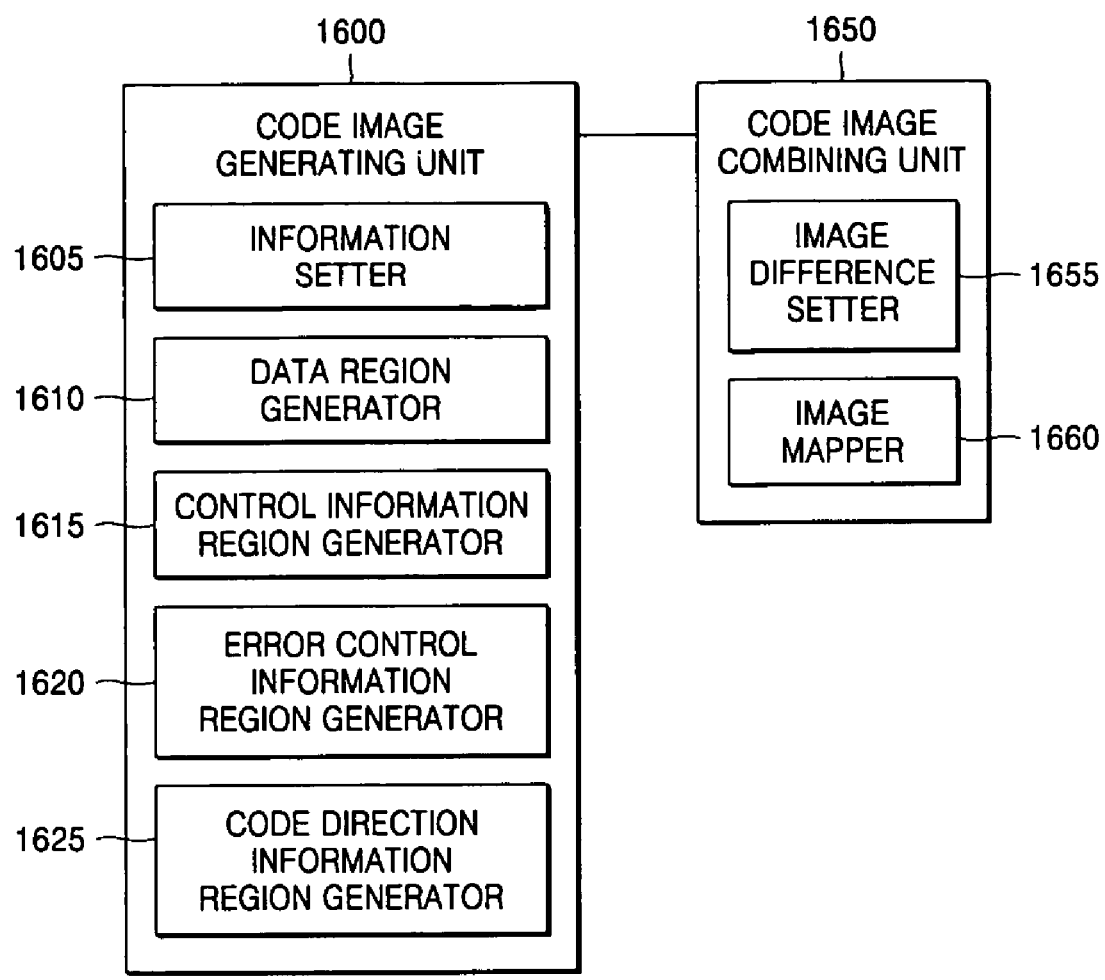
FIG. 16 is a block diagram of an apparatus for generating a mixed code according to an embodiment of the present invention.

FIG. 16 is a block diagram of an apparatus for generating a mixed code according to an embodiment of the present invention. Referring to FIG. 16, the apparatus includes a code image generating unit 1600 and a code image combining unit 1650. The code image generating 1600 includes an information setter 1605, a data region generator 1610, a control information region generator 1615, an error control information region generator 1620, and a code direction information region generator 1625. The code image combining unit 1650 includes an image difference setter 1655 and an image mapper 1660.

The code image generating unit 1600 generates a first code image and a second code image by encoding first information and second information made of at least one of a character, a number, a sign, and an image and second information to a first code image and a second code image made using colors, shading, shaping, a pattern, or a combination thereof, respectively.

The code image combining unit 1650 makes a physical or electronic mixed code image by setting the difference in color and brightness between the first and second code images and combining the first and second code images based on the set difference.

Specifically, the information setter 1605 makes interpretation information specifying the relationship between the first and second information, and construction information specifying the types of codes encoded in the first and second code images. The information setter 1605 makes information regarding the orientation and arrangement in which the first and second information are encoded into the first and second code images, respectively. Also, the information setter 1605 makes error control information used to determine whether encoding of the first and second information into the first and second code images, respectively, is satisfactory.

The data region generator 1610 encodes the first and second information in data regions of the first and second code images, respectively, based on the interpretation information, the construction information, and the information regarding the orientation and arrangement.

The control information region generator 1615 encodes the interpretation information and the construction information in control information regions of the first and second code images, respectively.

The error control information region generator 1620 encodes the error control information in error control information regions of the first and second code images, respectively.

The code direction information region generator 1625 encodes the information regarding the orientation and arrangement in code direction information regions of the first and second code images code, respectively.

The image difference setter 1655 determines the colors and brightnesses of the first and second code images so that the difference in color and brightness between the first and second code images has a predetermined threshold or more. The image mapper 1660 changes the colors and brightnesses of the first and second code images based on the set colors and brightnesses, and maps the first and second code images to each other to produce a mixed code.

Figure 17:
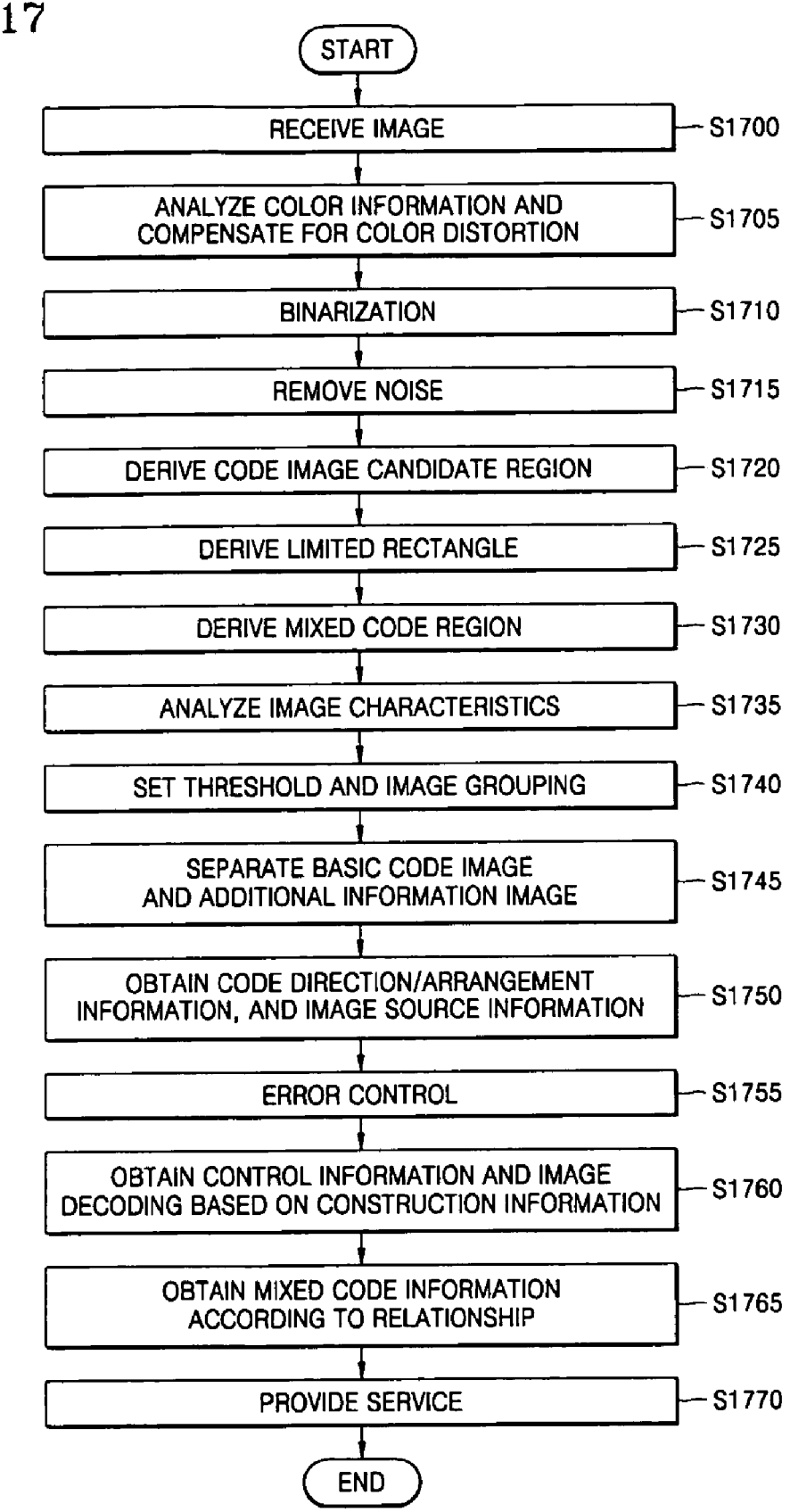
FIG. 17 is a detailed flowchart illustrating a method of decoding a mixed code according to an embodiment of the present invention.

FIG. 17 is a detailed flowchart illustrating a method of decoding a mixed code according to an embodiment of the present invention. Operations of the method illustrated in FIG. 17 will now be described in greater detail.

1. Input of Image, and Analysis of and Compensation for Color Information (S1700 and S1705)

In operations S1700 and S1705, an image with a mixed code is received from a scanner or a camera or digital data is read out from a computer, the image (or the digital data) is analyzed, and color distortion of the image (or the digital data) caused by use of an illuminator is removed. Unlike an image produced by a computer, the image input from the scanner or the camera would experience color distortion caused by ambient conditions or the characteristics of a tool used. Color distortion occurs depending on the degree or color of light emitted from an illuminator (a halogen lamp, a natrium lamp, an incandescent lamp, and so on), the color temperature of an image inputting apparatus, white balancing, the resolution of a printing apparatus, and an image model RGB or YUV.

The characteristics of a physical medium printed with the mixed code are major factors that cause color distortion. For instance, color distortion may be caused due to the color of paper or a medium printed with the mixed code (e.g., a pink newspaper), the resolution of the paper or the medium (newspaper: 75 1 pi, and a general type of paper: 300 dpi), or the color of or light reflected from the paper or the medium that is coated.

Color distortion sometimes prevents a color from being exactly recognized, and as a worst scenario, it causes the color to be recognized as a wrong color. For instance, a halogen lamp, which is a red-based illuminator, places emphasis on a red color value R of the RGB channels, and thus, green may be recognized as red.

When a reproduced image of the original image appears to have a higher amount of a specific color compared to the distribution of all colors of the original image, the colors of the reproduced image are preferably adjusted by performing an arithmetic operation on RGB values of each pixel thereof. A gray world assumption (GWA) technique is a representative way of adjusting colors of an image. The GWA technique is based on an assumption that the average of the respective RGB values of all pixels of an image, which is captured under general ambient conditions, approximate to a predetermined value, i.e., a gray color value. In general, the GWA technique is used to process a large image that contains various types of elements, captured under general ambient conditions. However, it is applicable to a code recognition application that uses general colors and brightness, since the mixed code is likely to be included in an image with general elements and a surplus margin.

In other words, using the GWA technique, the RGB values of each pixel of the original image are measured, the average of the RGB values are computed, respectively, the similarity among the three mean values is computed, and the difference between the value of a specific channel and a predetermined threshold is compensated for.

$$M(i)=M(i)-(E(i)-WE(G)) \text{ where } i|E(i)>WE(G), i \in R, G, B \quad (1),$$

wherein M(i) denotes an i-channel of whole image; E(i) denotes a mean value of i-channel values of a whole image; E(G) denotes the mean value of brightness values of the whole image, which is computed by M(R)+M(G)+M(B)/3; and W denotes a weight.

In Equation (1), a subtraction operation is used to compensate for a color value, but various operations such as an addition operation, an exponential operation, and a log operation may be used. In addition, a gamut mapping or a correlation method may be used for compensation for a color value, in particularly, when camera characteristic information is given.

2. Binarization (S1710)

In operation S1710, the image input from the scanner or the camera, or the digital image of the image is transformed to a black-and-white image. In general, a color image is transformed into a black-and-white image using a threshold which is a specific value in the field of image processing, since the amount of computation of a black-and-white image are less than that of a color image and the black-and-white image can be more easily processed than the color image. The original image is stored in a separate region.

If necessary, several thresholds to be used when the result of transformation is not satisfactory are set, thereby improving the result of transformation. Otherwise, the threshold may be determined by computing brightness values of the whole image, computing an average value or a mean value of the brightness values or analyzing a value of brightness distortion of image, dividing pixels into groups having similar brightness values, and computing an average of the similar brightness values of the groups.

Whether the result of transformation is satisfactory is determined in subsequent operations in which a limited rectangle of the mixed code and a code region are derived, respectively, which will later be described.

$$P(x,y)=1, \text{ where } P(x,y)<T$$
$$0, \text{ Otherwise} \quad (2),$$

wherein P(x,y) denotes the brightness value of pixel coordinates (x,y), and T denotes the threshold.

3. Cancellation of Noise (S1715)

In this operation, noise is canceled from a binarized image. In general, noise is canceled by using length-based filtering, masking, or the relationship between the noise and the edge of an input image and noise.

Noise, which represents unnecessary elements of an image and is contained in a low-quality binary image in general, is canceled in this operation. In the length-based filtering, noise is removed by canceling a pixel with a specific brightness value by performing an operation on pixels to the left, right, top, and bottom of the pixel when the value of the pixel is less than a predetermined reference value.

In the masking, noise smaller than a specific size is canceled by masking each pixel of a block image of a specific size. Canceling noise by using the property of an edge portion of an input image is based on a fact that in general, a code image includes a quite zone (a surplus space around a code).

In general, a code includes a white surplus space, which separates a code image from background color or the surroundings (characters, colors, or the like), to protect the code image. Therefore, cancellation of noise connected to the edge portion of the input image draws an effect of removing only the noise from the image, since the edge portion is not associated with the code image.

Noise that is not connected to the edge of the input image are preferably removed by using size-based filtering or length-based filtering. In size-based filtering and length-based filtering, the size and length of a pixel are preferably less than those of a minimum unit of element images constituting the mixed code. Otherwise, the mixed code image may be damaged.

$$f_{noise}(O_{xy})=0, \text{ where } Size(O_{xy})<D(\text{white})$$
$$1, \text{ Otherwise (black)} \quad (3),$$

wherein $f_{noise}(\ )$ denotes a noise cancellation function, $O_{xy}$ denotes an object image with coordinates (x,y), Size($O_{xy}$) denotes the size of the object image with coordinates (x,y), and D denotes a threshold size or a threshold length.

4. Derivation of Candidate Region of Code Image (S1720)

Blocking is an operation which is first performed to detect a region including the mixed code from the input image. In blocking, the input image is divided into block units, the size of a black image selected from binarized images is computed, and a block with a largest image is detected based on the size of the black image.

In general, since a relative or absolute minimum size of the code image to be decoded has been determined, the size of the block is adjusted to the minimum size, and a total number of black pixels in each block is computed to detect a block having a largest number of black pixels. The center of the block having the largest number of black pixels is very likely to be located inside the code image. Accordingly, it is possible to easily determine the location of the code image through blocking.

In the case where the total number of black pixels in the blocks are almost the same, the connection between images included in the blocks is detected to determine whether they form a whole image. If not, it is highly probable that the input image includes a plurality of code images. In this case, the images in the blocks may be determined as code image regions and separately processed. Also, the code image is likely to be located around the center of the input image. In this case, even if the code image is small, it can first be processed by applying a weight to a central block if required.

$$i = \max(i|\text{sum}(P_i(x,y))), i=0, 1, \ldots, B-1 \quad (4),$$

$P_i(x,y)$ denotes a pointing value (0 or 1) of an $i^{th}$ block, and B denotes a maximum number of blocks.

5. Derivation of Limited Rectangle (S1725)

The limited rectangle, which is a rectangle enclosing the mixed code image, is derived by determining four vertexes of the limited rectangle, using the location of the mixed code that is detected using blocking, and maximum and minimum location values of an image forming the mixed code. That is, the limited rectangle is derived by setting a point in the mixed code image, which is detected by blocking, to a central point and using the maximum and minimum location values of an image that includes the point. The mixed code region is derived from the limited rectangle.

If the inside of the mixed code image is entirely colored, the connection between the central point and the inside of the mixed code may be determined to detect the maximum and minimum location values. Alternatively, a virtual rectangle enclosing the mixed code image may be detected from the outside of the mixed code image to the central point in upper, lower, left, and right directions.

In the case of the mixed code image that has a pattern shape or an open shape, when the distances between elements of the mixed code image are less than a threshold, the mixed code is considered as being included in one image and the limited rectangle is derived from the mixed code image.

FIG. 18 illustrates results of binarizing a mixed code image and searching for a limited rectangle according to an embodiment of the present invention. FIG. 18A illustrates a mixed code image, the inside of which is completely colored, and (b) and FIGS. 18B and 18C illustrate mixed code images, the insides of which are incompletely colored. FIGS. 18A through 18C are obtained by binarizing the mixed code image based on an assumption that when the distance between elements of the mixed code is less than a threshold, the elements are connected to each other.

Whether the mixed code image can be detected using the shape of the limited rectangle in operation S1725 may be determined. When the limited rectangle distorts extremely, for example, it is a trapezoid, it is determined that an error occurs during a binarization process or a noise cancellation process. In this case, a new limited rectangle is preferably derived again after the threshold is readjusted through binarization. Also, when another candidate block is detected during blocking, a new limited rectangle may be detected using the detected limited rectangle.

6. Derivation of Mixed Code Region (S1730)

In operation S1730, the mixed code image is detected from the limited rectangle. The limited rectangle may include not only the mixed code image but also noise enclosing the mixed code image, and thus, the mixed code must be exactly detected from the limited rectangle. In general, the mixed code image is detected by detecting a borderline determining the limits of the mixed code image, or a code sensing pattern.

If the mixed code is clogged, e.g., the color code, it is possible to detect it by extracting characteristic points of an outer portion of the mixed code image or the borderline of the mixed code image.

For instance, the vertexes of the mixed code image are detected using the limited rectangle and points of images in the limited rectangle, which contact the limited rectangle. Also, the mixed code image can be detected by determining whether each image is continuous while following its outer lines from the points to separate the mixed code image from noises, and selecting a largest image as the mixed code image from the images. In general, the outer line of the code image may be detected using an edge detecting method using an Laplacian filter or a Sobel filter or a turtle algorithm.

However, in the case of a 2D code or a barcode that has a pattern shape and thus is difficult to detect the overall borderline thereof, the mixed code image can be derived by detecting a code sensing pattern or starting and ending patterns, and detecting all code sending patterns. Detecting of the patterns is limited within the limited rectangle, and thus, it is possible to easily detect the mixed code image.

Like the limited rectangle, it is possible to determine whether the mixed code image region is appropriately extracted from the limited rectangle. If the extracted mixed code image distorts extremely, binarization is performed again to reset the threshold and then the mixed code image is extracted again. If another candidate block is detected during blocking, it is possible to detect the limited rectangle again using the candidate block.

7. Analysis of Image Characteristics (S1735)

When the mixed code image is derived, it is possible to acquire information regarding the locations of the characteristic points or starting and ending regions of the mixed code image, and the borderline of the mixed code. For instance, when the derived mixed code image is a rectangle, information regarding four vertexes thereof is obtained. If the mixed code image is a pattern, information regarding characteristic points of each location detecting pattern is obtained. If the mixed code image is a circle or an oval, information regarding a region inside the borderline is obtained. Based on the obtained information, characteristics of images in the mixed code image are analyzed.

The characteristics of the images are analyzed mainly by measuring the distributions of colors and brightness, using information regarding the original color image corresponding to mixed code image, which is obtained through binarization.

The image characteristics are analyzed to separate a basic code image and an additional information image, which constitute the mixed code image, from each other, since in general, they are combined based on the difference in color or brightness between them.

In general, the basic image and the additional image are differentiated from each other by using colors, and by not using colors. When using colors, one of the two images is represented based on color information, and the other is represented using different color or shading. When not using colors, they are differentiated from each other using the brightness difference between them.

In general, the color information is first analyzed by collecting information regarding image pixels in the mixed code image. Whether the mixed code image uses the color information is determined according to the result of analysis, and the distribution of colors is computed using a RGB channel when it is determined that the mixed code image uses the color information.

Whether the mixed code image uses the color information may be determined by computing a brightness value of each pixel and comparing the brightness value with each of the values of RGB channels of the pixel. When the value of a specific channel is less or greater than a threshold, it is determined that the mixed code image uses a color corresponding to the specific channel. Otherwise, whether the mixed code image uses the color information may be determined by computing the relationship between RGB channels. That is, when the difference among the RGB channel values is greater than a threshold or a threshold rate, it is determined that the mixed code image uses the color information. If the basic code image and the additional information image are differentiated from each other using only brightness difference, it means that they are represented with an achromatic color, and thus, the RGB channel values of each pixel are similar. When it is determined that the basic code image and the additional information image use the color information, the color distribution is analyzed to compute the type, distribution region, or characteristics of the color.

When the basic image and the additional image are differentiated from each other using brightness difference, it is also possible to compute the type, number, and distribution characteristics of brightness information by computing the brightness distribution of pixels in the mixed code image. For instance, when a lot of white pixels are distributed throughout the mixed code image, the mixed code image is considered as having the mixed code, such as a 1D barcode or a 2D white-and-black code, which mainly uses a pattern, a trademark, or a logo. When the mixed code image includes a small number of white pixels or no white pixels, the mixed code image is considered as having a code, such as a color code or a gray code, which is mainly represented as a region type (which processes a code region using colors or shading), not a pattern type image. In this case, such image characteristic information is obtained to be used as basic information for later decoding.

8. Setting of Threshold and Grouping (S1740)

In operation 1740, reference values to be used in separating the basic code image and the additional information image from the mixed code image are determined, using image information regarding the mixed code image, which is obtained through analysis of image characteristics.

When colors are used to distinguish the basic code image from the additional information image, the distribution of colors and the relationship between color channels are measured and the result of measurement is determined as a reference value to be used in determining colors. For instance, when one of RGB channel values or a combination thereof is greater than a threshold, a pixel with the RGB channel values is considered as having a predetermined color. Accordingly, absolute values, a reference ratio, or a combination of the RGB channels of each pixel, which can be determined as reference color values, may be determined as reference values.

For instance, when a color model is an RGB model, it is possible to set a set of RGB values, which are to be used in determining each color, as reference values. When the color mode is a HSV(HSB) model, it is possible to set a relative value or an angle value representation of hue, saturation, and brightness as the reference values. For instance, when using the HSV model, a hue value of a pixel located between 60° and 180° is green, that of a pixel located between 180° and 300° is blue, and that of a pixel located at one of the other angles is red. In this case, 60°, 180°, and 300° are used as thresholds.

$$P(i) = G \text{ where } Tg1 <= HSV(p(i)) < Tg2 \quad (5)$$
$$= B \text{ where } Tb1 <= HSV(p(i)) < Tb2$$
$$= R \text{ where otherwise,}$$

wherein Tk denotes a $k^{th}$ color threshold.

For brightness information, thresholds must also be estimated to be used as reference values in categorizing images mainly into white, black, and gray images. Since gray may be divided into a plurality of levels, a plurality of thresholds corresponding to the plurality of levels may be determined.

In general, brightness values of the mixed code image are analyzed through a histogram technique, and a threshold is determined by using a dense area and a spare area of pixels of a specific brightness value. That is, dense areas of the pixels with the specific brightness value are categorized into groups, and brightness values used to categorize the groups are set as thresholds.

The basic code image and the additional information image constituting the mixed code image may be distinguished from each other, using a combination of a color and a color, a color and brightness, or brightness and brightness. When using colors, it is preferable that the color of each pixel of the mixed code region is compared with a reference color using a color threshold and the colors are divided into several groups according to the connection or the threshold distance between the pixels. When the colors are grouped, virtual cells are obtained.

That is, although being different in shading or brightness levels, pixels whose colors are determined to be the same are adjacent to each other, are considered as belonging to the same group. If a code is obtained by coloring a pattern and thus the distance between pixels is large, cells are obtained by computing the distance, virtually filling the distance with the same color when the distance is less than a threshold, and categorizing the pixels into groups.

Similarly, it is possible to transform the mixed code image into cells, using thresholds for the brightness information. However, in the case of brightness information, there are a lot of points to be considered. One of the points is that when used together with a color, brightness may be represented while changing the shade of the color. For instance, when a pattern type code such as the QR code is added onto the color code, each pixel of the QR code may be represented with the color that is equal to that of a color cell to overlap with the pixel but is darker or lighter than the color of the color cell.

In this case, all cells of the QR code may do not have the same brightness value. Accordingly, a threshold must be obtained by computing the difference in brightness/shade between regions of a cell, which are divided using a color threshold. Also, the regions of the cell must be divided into groups according to the brightness and shade of each color, using the threshold. For instance, it is possible to extract darker portions from each color cell region and pattern the extracted portions.

Of course, a figure, an image, a symbol, or a character can be added to a code image represented using a color or gray, the figure, the image, the symbol, or the character having the same brightness value as the code image. In this case, it is possible to separate the figure, the image, the symbol, or the character from the code image only by extracting a threshold for only brightness information.

9. Separation of Basic Code Image and Additional Information Image (S1745)

When the mixed code image is divided into groups using color and brightness thresholds, image separation is performed based on the groups, and image grouping is performed according to image elements. When using colors, it is preferable that image separation is performed using color difference, and then, image separation is performed using brightness difference.

When using colors, it is possible to extract cells or patterns that are determined to have the same color, using a color threshold, and categorize the extracted cells or patterns into groups according to color. Similarly, when using brightness, it is possible to extract patterns or cells using an absolute value or a relative difference and categorize them into groups.

For image grouping, criteria and method therefor are preferably predetermined in a program. For instance, a mixed code image using color and brightness information is set to be grouped into images constructed according to color information and images constructed according to brightness information. Then, information regarding colors determined by a color threshold may be collected and grouped to form an image, and information regarding relative brightness differences in the resultant color cell may be groped to form another image, thereby obtaining a mixed code including the color code and the QR code, for example. That is, a white region and a black region of a color code including color cells are mapped to a lighter color and a darker color, respectively.

Alternatively, images with lighter pixels, and images with darker pixels may be grouped into two images. A portion that the two images overlap each other may be separately represented using a different brightness level or a different color. For instance, when the QR code and the barcode, which are printed with black and white in general, are combined, they are mapped to different brightness.

Of course, when the QR code and the barcode have different colors, it is possible to more easily differentiate them from each other. For instance, the QR code is mapped to red, the barcode is mapped to blue, and a portion the QR code and the barcode overlaps with each other is mapped to purple. If the mixed code image is comprised of such the QR code and the barcode, it is possible to more easily separate images from the mixed code image.

The grouped images are divided into the basic code image and the additional information image. Determining whether one of the grouped images is used as the basic code image or the additional information image will later be described.

10. Extraction of Code Direction/Arrangement Information, and Image Source Information (S1750)

First, code direction information must be obtained to extract information from the separated two images. The code direction information specifies an angle of rotation that is the difference between the original angle of the code image and an angle of the code image that is rotated. It is impossible to extract code information according to a normal order without the angle of the code image According to the preset invention, the code information is extracted from the two images separated from the mixed code image. A method of extracting the code information is selected according to image characteristics. For instance, when an image is a code image, a predetermined pattern or location information indicating the direction of the code is included in the image.

FIG. 19 illustrates a mixed code image with code direction and arrangement information according to embodiments of the present invention. In the case of a 1 D barcode illustrated in (c) of FIG. 19, a PDF-417 code, or an ultra code, it is possible to obtain code direction information by detecting starting and ending patterns. In the case of a 2D code, particularly, a QR code illustrated in (b) of FIG. 19, it is possible to obtain code direction information based on a relative location of a detected predetermined location detecting pattern. When using colors, as illustrated in (a) of FIG. 19, code direction and arrangement information may be arranged in a predetermined sequence of colors or represented using a combination of parity information as in the color code or the gray code.

The directions of pixels of a mark, a trademark, a character, or a photograph can be detected using information regarding their characteristic points, line types, and directions. However, since it is difficult to compute the information beforehand and a large amount of computation is required, it is preferable that a location pattern of such an image is added to or this image is set as an additional image when encoding the image so that direction information can be detected using a basic code image.

Arrangement information is information based on which a specific position in a code image is indicated or decoding is performed. In general, the barcode or the 2D code includes specific arrangement patterns as reference patterns to be used in decoding. The specific arrangement patterns may be a center separation pattern of the barcode, or arrangement patterns arranged on and a left outer side of a data matrix. The color code or the gray code does not require the arrangement patterns since a related program provides information that they are divided into a specific number of matrices. However, arrangement information is required when cells are divided by a border line or a border region is provided.

In general, code direction information is related to position detection information. A direction information pattern may be included as a subset in an arrangement pattern, or the arrangement pattern may be identical to the direction information pattern. In the case of the color code and the gray code made in units of regions, not patterns, a direction detection cell can be detected using parity information regarding each cell, and arrangement information specifies a borderline between the cells or a predetermined division ratio.

In the case of a region type code, since color information of every cell must be obtained to detect the direction detection information, source information values of the code are computed and then the direction detection region is detected. Thereafter, the source information values are rearranged according to the code direction.

The source information is obtained by extracting information from all obtained images in minimum units. The extracted information may be transformed into a number, a character, a sign, a symbol, and/or a color value according to a predetermined transform table.

In the color code, a color value of each cell divided from an image is expressed with numbers and characters, obtained according to a predetermined transform table. In a black-and-white barcode or the QR code, black and white patterns are divided into predetermined module units and represented with a series of 0's and 1's. The sizes of such minimum units may vary according to the arrangement pattern. That is, the size of a minimum unit such as a set of cells or patterns is determined by the size and position of the arrangement pattern or predetermined instructions in a program.

For instance, it is possible to determine a total number of matrix type modules constituting the QR code by computing the sizes of location detection patterns and a ratio of distances between the patterns. In the case of the color code, cell size is determined using a borderline and a code region is divided into units of cells. When not using the borderline, cell size is determined and a code region is divided in units of cells, based on that a program instruction that a code that has a regular tetragon shape is 5×5 and a code that has a right-angled tetragon shape is 8×5. Likewise, a sign, a trademark, a pixel, or an image, information regarding the location of which is difficult to be obtained, may be divided into module units and an operation may be performed on each module unit.

However, it is not required to derive the source information and direction and location information from both the two images separated in operation S1745, since construction information of the image whose source information and direction and location information are not derived can be obtained using control information which is to be obtained in a subsequent process. Basically, a code image containing location and arrangement information may be either a basic code image or an additional information image. If both the basic code image and the additional information image include the location and arrangement information, the types of the basic code image and the additional information image are predetermined in a program, or a code image including control information is detected and one of the separated two images is determined as the basic code image using the detected code image.

11. Error Control of Derived Code Image (S1755)

In operation S1755, whether each image includes an error is checked and an error, if any, is corrected based on the obtained source information. When the source information is extracted from only one of the two images according to the direction and arrangement information, this error is corrected. If the parity operation is used, it is possible to easily detect an image containing an error using the parity operation. If the mixed code does not include information for error correction, the thresholds are reset in operation S1710 or S1740 and error checking and correction are performed again. If the mixed code includes error correction information, the error can be corrected using the error correction information.

When the source information is extracted from both the two images, it is possible to detect and/or correct an error from both the two images using error control information. When one of the two images has an error, operation 1740 and error checking and correction, i.e., operation S1755, may be performed again on only the image with the error. In the case of a region type code, since the parity operation is performed thereon before operation S1755, the result of operation is considered.

12. Derivation of Control Information and Image Decoding (S1760)

In operation S1760, the obtained source information is divided into predetermined units of regions to obtain an information region and a control information region. Since the code direction information, the arrangement information region, and the error control region were obtained in the foregoing operations, the information region and the control information region can be easily obtained. If the source information is obtained from only one of the two images, the control information is derived to obtain the construction information of the other image and information regarding the relationship between the two images. The result of encoding the control information is preferably included in the image region, but when the relationship between the basic information and the additional information is set via a program, information regarding the relationship is used as the control information as described in 2.1 regarding operation S1100.

(1) Derivation of Construction Information of Mixed Code

The construction of the mixed code is determined to extract the basic information and the additional information from the source information on which error checking and correction is performed based on the error control information. The construction information regarding each image is obtained based on the derived control information. If both the two images include the control information, it is possible to determine the constructions of both the two images from the control information.

However, when the control information can be extracted from one of the two images, it is possible to determine the construction information regarding only the other image based on the extracted control information. The construction information may specify the type of the basic code image, a total number, positions, and types of additional information element images, directions of the additional information element images that are arranged, a total number of sub-basic information images, and an encryption method used.

(2) Image Decoding Based on Construction Information

Since the construction information specifies the arrangement and positions of the additional information element images, each additional information element image is divided into predetermined units based on the construction information and decoded according to the type thereof. For decoding, each additional information element image is adjusted to its original position based on the information regarding the directions of the additional information element images arranged, and recovered to its original state according to a predetermined algorithm using the information regarding the encryption method.

A key value for decoding may be set in the control information or designated in a decoding program. Otherwise, when a program requires a key value to determine whether a user is an authorized user, the key value may be given from the user.

Next, decoding is performed on a predetermined region of each additional information element image based on the information regarding the types and positions of the additional information element images. In detail, decoding is performed by detecting an arrangement pattern, dividing each additional information element image into module units, extracting a source code, and extracting error correction information. A process that is not indicated in the control information may be skipped. The shape of data in each information region obtained by decoding may vary depending on the types of the additional information element images, specified in the control information region.

For instance, when the additional information element image is a general code image, code information values are derived as a character, a number, a sign, and/or so on. When the additional information element image includes a character, a mark, or a trademark, code information values are derived as predetermined values, such as an 8-direction chain code, a shape number, or a Fourier descriptor, through pattern matching. The 8-direction chain code, the shape number, and the Fourier descriptor are represented with corresponding numbers, characters, signs, symbols, or marks. To obtain such information, pattern information may be obtained by additionally processing each additional information element image using a conventional image processing technique, such as thinning, filtering, or planarizing, so that pattern information can be easily obtained; detecting connection points or characteristic points of obtained segments; and producing the pattern information based on the result of detection. Further, a luminosity value or a color value of each pixel of a photograph image may be represented using a brightness value or a set of RGB channel values.

13. Derivation of Mixed Code Information Based on Interpretation Information (S1765)

After deriving the information regions from the two images based on the construction information included in the control information, the basic information and the additional information are extracted from the derived information regions in operation S1765. Based on the control information set in the code or a program, each information region was made by combining the basic information and the additional information and normalizing the result of combining.

Operation S1765 is performed using the interpretation information included in the control information of the mixed code. First, information that is obtained from each information region and has yet to be normalized is rearranged in the original state by performing inverse transform, which is one of encoding techniques, thereon based on the information regarding manner of information arrangement, stored in the control region. Information regarding the basic information and the additional information are represented in predetermined information formats. The information formats may be specified in a predetermined transform table in a program. Thus, two pieces of information are obtained.

One of the two pieces of the information is used as the basic information and the other is used as the additional information. As described above, a policy that determines which one of the two pieces of the information will be encoded into a basic code image, must be mapped in the control information region or programmatically predetermined. The policy may be specified either in the relationship information of the control information or the construction information.

The two pieces of the information are checked and an operation is performed thereon, based on the relationship information in the control information, thereby producing the original mixed code information. The mixed code information is obtained as a piece of information, or separate pieces of information if required.

For instance, when the basic information is identical to the additional information, a code that can be easily or exactly recognized is derived from one of them. This is the same when the basic information and the additional information are related to each other. However, when each of them includes the other, both code information of a base set and code information of a subset must be obtained. When the additional information image is a photograph, it is derived as a visual image, and information regarding a basic code used together with this image is separately provided. As described above, such information is represented using a character, a number, a sign, a figure, an image, or a trademark.

14. Provision of Service (S1770)

The obtained mixed code information can provide a variety of services according to the control information or service information set in a program. For instance, if the mixed code information specifies individual identification and includes photograph information, it can be used to provide a service such as a passport authentication interface or a photo business card interface. Likewise, when the mixed code information includes the basic information and the additional information that are related to each other, it is applicable to physical distribution and inventory control.

The present invention can be embodied as a computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable medium can be distributed among computer systems that are interconnected through a network, and the present invention may be stored and implemented as a computer readable code in the distributed system.

The mixed code according to the present invention may include visual information indicating the purpose of the mixed code, a field to which the mixed code is applicable, and a way of using the same, thereby enabling a user to easily recognize it. For instance, it is possible to manufacture a cell or a pattern of an image code to include a company name or a uniform resource locator (URL), using a mixed code that is a combination of an image code and characters. Also, it is possible to manufacture an image code or each cell of the image code to include information regarding a logo, a symbol or a sign, using a mixed code that is a combination of an image code. Further, it is possible to manufacture a complex mixed code that is a combination of an image code, a character, and a logo.

In addition, additional information can be provided by adding an additional information image to the original image code. That is, it is possible to increase the amount of data to be contained in the mixed code by changing or adding additional information to the code.

The mixed code includes information specifying a code region, code direction, and reference points regarding an additional information image, thereby easily searching for the additional information image. That is, when a range of recognition is limited to the code region, it is possible to obtain additional information regarding the shape of the code region, e.g., the orientation and characteristic points thereof.

An error control information region of the mixed code is used to check and correct an error in basic code information. The basic code image and the additional information image are constructed to be decoded using a key value and an encryption method, thereby detecting whether a user is an authorized user who owns a right for a service.

Also, it is possible to make the additional information image be a photograph image so that it can be used in a security service. In addition, the mixed code according to the present invention is applicable to various fields of services such as inventory control.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A computer readable storage medium having embodied thereon a mixed code a mixed code obtained by overlapping first information with second information in a region, the first and second information made using at least one of a character, a number, a sign, and an image, the mixed code comprising:
    a first code image region storing a first code image obtained by encoding the first information and construction information regarding a second code image, the first code image made using colors, shading, or a combination thereof; and
    a second code image region storing the second code image obtained by encoding the second information, the second code image made using colors, shading, or a combination thereof, the second code image overlapping with the first code image, the colors and shading being distinguished from the colors and shading used in the first code image, using a predetermined threshold.

2. The mixed code of claim 1, wherein in the first code image region, the first code image is obtained by encoding construction information specifying the type of the second code image and the first information.

3. The mixed code of claim 2, wherein the construction information comprises at least one of:
    information regarding a total number of sub-image regions obtained by dividing the first code image region into equal parts;
    information regarding a total number of element images of the second code image;
    information regarding location of the center of each element image in each sub-image region;
    information regarding the types of codes of the element images;
    information regarding an encryption method used to encrypt the element images; and
    information regarding a direction in which each of the element images is arranged.

4. The mixed code of claim 1, wherein in the first code image region, the first code image is obtained by encoding information regarding the relationship between the first and second information, together with the first information.

5. The mixed code of claim 1, wherein the first code image region comprises:
    a basic information region storing a code obtained by encoding the first information, the code made using colors, shading, or a combination thereof;
    a control information region storing a code obtained by encoding the construction information regarding the second code image and the information regarding the relationship between the first and second information, the code made using colors, shading, or a combination thereof;
    an error control region storing a code obtained by encoding an error checking code, the code made using colors, shading, or a combination thereof, the error checking code used to detect and correct an encoding error in the basic information region; and
    a direction detection region storing a code obtained by information regarding a direction in which the first code image is located, the code made using colors, shading, or a combination thereof.

6. A method of generating a mixed code, comprising:
    (a) encoding, using a processor, first information and second information into a first code image and a second code image made using colors, shading, shaping, a pattern, or a combination thereof, respectively, each of the first and second information being made using at least one of a character, a number, a sign, and an image;
    (b) generating a mixed code image by setting a difference in color and brightness between the first and second code images and combining the first and second code images according to the set difference, wherein the first code image includes construction information regarding the second code image; and
    (c) transforming the mixed code image into a physical image or an electronic image, and outputting the physical image or the electronic image.

7. The method of claim 6, wherein (a) comprises:
    (a1) setting interpretation information specifying the relationship between the first and second information;
    (a2) setting construction information specifying types of codes in the first and second code images;
    (a3) encoding the first and second information as data regions of the first and second code images, respectively, according to the interpretation information and the construction information; and
    (a4) encoding the interpretation information and the construction information as a control information region of first code image.

8. The method of claim 7, wherein the interpretation information comprises at least one of:
    information regarding the relationship between the first and second information;
    information regarding a format of information in each of the first and second code images;
    information regarding a manner of the information in each of the first and second code images is arranged; and
    information regarding a field of a service to which the mixed code is applied.

9. The method of claim 6, wherein the construction information comprises at least one of:
    information regarding a total number of sub-image regions obtained by dividing the first code image region into equal parts;
    information regarding a total number of element images of the second code image;
    information regarding location of the center of each element image in each sub-image region;
    information regarding the types of codes of the element images;
    information regarding an encryption method used to encrypt the element images; and
    information regarding a direction in which each of the element images is arranged.

10. The method of claim 6, wherein (a) comprises:
    (a1) encoding the first and second information as data regions of the first and second code images, respectively;
    (a2) setting error control information used to determine whether the encoding of the first and second information as data regions is satisfactory;
    (a3) encoding the set error control information as error control information regions of the first and second code images, respectively.

11. The method of claim 6, wherein (a) comprises:
    (a1) setting direction and arrangement information regarding a direction and arrangement of each of the first and second code images obtained by encoding the first and second information, respectively;
    (a2) encoding the first and second information as data regions of the first and second code images, respectively, based on the direction and arrangement information; and (a3) encoding the direction and arrangement information as code direction information regions of the first and second code images, respectively.

12. The method of claim 6, wherein (b) comprises:
(b1) setting a difference in color and brightness between the first and second code images; and
(b2) combining the first and second code images based on the difference in color and brightness, such that the second code image overlaps with the first code image.

13. A method of generating a mixed code, comprising:
(a) encoding, using a processor, first information and construction information regarding a second code image made using at least one of a character, a number, and a sign into a first code image made using colors, shading, shaping, a pattern, or a combination thereof;
(b) encoding second information into a-the second code image made using colors, shading, shaping, a pattern, or a combination thereof the second information obtained by performing at least one of adding new information to the first information and deleting and changing information in the first information;
(c) changing color and brightness of the second code image such that a difference in color and brightness between the first and second code images corresponds to a predetermined threshold;
(d) generating the mixed code by mapping the changed second code image to the first code image, and
(e) transforming the mixed code into a physical image or an electronic image, and outputting the physical image or the electronic image.

14. The method of claim 13, wherein (b) comprises:
(b1) setting information regarding the relationship between the first and second information and construction information regarding the second code image; and
(b2) encoding the second information as a data region of the second code image, and the information regarding the relationship and the construction information as a control information region of the second code image.

15. An apparatus for generating a mixed code, comprising:
a code image generating unit encoding first information and second information into a first code image and a second code image which are using colors, shading, shaping, a pattern, or a combination thereof, the first and second information made using at least one of a character, a number, a sign, and an image; and
a code image combining unit producing a physical or electronic mixed code image by setting a difference in color and brightness between the first and second code images and combining the first and second code images based on the set difference in color and brightness;
wherein the first code image includes construction information regarding the second code image.

16. The apparatus of claim 15, wherein the code image generating unit comprises:
an information setter setting interpretation information which specifies the relationship between the first and second information, and construction information which specifies types of codes in the first and second code images;
a data region generator encoding the first and second information as data regions of the first and second code images, respectively, according to the interpretation information and the construction information; and
a control information region generator encoding the interpretation information and the construction information as control information regions of the first and second code Images.

17. The apparatus of claim 15, wherein the code image generating unit comprises:
a data region generator encoding the first and second information as data regions of the first and second code images, respectively;
an information seller selling error control information used to determine whether the encoding of the first and second information as the data regions is satisfactory; and
an error control information region generator encoding the set error control information as error control information regions of the first and second code images.

18. The apparatus of claim 15, wherein the code image generating unit comprises:
an information seller selling direction and arrangement information regarding direction and arrangement of the first and second code images obtained by encoding the first and second information;
a data region generator encoding the first and second information as data regions of the first and second code images, respectively, based on the direction and arrangement information; and
a code direction information region generator encoding the direction and arrangement information as code direction information regions of the first and second code images.

19. The apparatus of claim 15, wherein the code image combining unit comprises:
an image difference seller selling a difference in color and brightness between the first and second code images to be equal to or greater than a predetermined threshold; and
an image mapper changing the first and second code images based on the set difference in color and brightness and mapping the first code image to the second code image to produce the mixed code.

20. A computer readable storage medium having embodied thereon a computer program for executing the method of claim 6.

* * * * *